(12) United States Patent
Hayashi et al.

(10) Patent No.: US 8,633,998 B2
(45) Date of Patent: Jan. 21, 2014

(54) IMAGING APPARATUS AND DISPLAY APPARATUS

(75) Inventors: Junji Hayashi, Saitama (JP); Satoru Wakabayashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 450 days.

(21) Appl. No.: 13/013,705

(22) Filed: Jan. 25, 2011

(65) Prior Publication Data

US 2011/0234853 A1 Sep. 29, 2011

(30) Foreign Application Priority Data

Mar. 26, 2010 (JP) ................................ 2010-072511

(51) Int. Cl.
*H04N 5/76* (2006.01)
*H04N 5/222* (2006.01)

(52) U.S. Cl.
USPC ................................. 348/231.3; 348/333.01

(58) Field of Classification Search
USPC ................. 348/36, 42, 47, 51, 231.99, 231.3, 348/231.6, 333.01, 333.05
See application file for complete search history.

(56) References Cited

U.S. PATENT DOCUMENTS

| | | | |
|---|---|---|---|
| 7,646,420 B2 | 1/2010 | Misawa et al. | |
| 7,724,300 B2 | 5/2010 | Misawa et al. | |
| 7,834,928 B2 | 11/2010 | Misawa et al. | |
| 7,859,584 B2 * | 12/2010 | Santo et al. | 348/333.05 |
| 7,948,549 B2 * | 5/2011 | Honjo et al. | 348/333.05 |
| 8,144,231 B2 * | 3/2012 | Miyashita | 348/333.05 |
| 8,345,141 B2 * | 1/2013 | Yumiki | 348/333.05 |
| 8,411,191 B2 * | 4/2013 | Yumiki | 348/333.05 |
| 2003/0160886 A1 | 8/2003 | Misawa et al. | |
| 2006/0062296 A1 * | 3/2006 | Li et al. | 375/240.12 |
| 2006/0285150 A1 | 12/2006 | Jung et al. | |
| 2009/0153649 A1 | 6/2009 | Hirooka et al. | |
| 2009/0153722 A1 | 6/2009 | Fujio et al. | |
| 2010/0225798 A1 | 9/2010 | Lim | |
| 2011/0234881 A1 | 9/2011 | Wakabayashi et al. | |

FOREIGN PATENT DOCUMENTS

JP 2004-207774 A 7/2004
JP 2006-238326 A 9/2006

OTHER PUBLICATIONS

U.S. Office Action dated Aug. 9, 2012, for U.S. Appl. No. 13/013,426.

* cited by examiner

*Primary Examiner* — Timothy J Henn
(74) *Attorney, Agent, or Firm* — McGinn IP Law Group, PLLC

(57) ABSTRACT

Provided are an imaging apparatus and a display apparatus capable of taking a plurality of plane images in different photographing ranges and storing a display method of the plane images along with the taken plane images to arrange a reproduction method during imaging. When moving images are taken by a tele/wide simultaneous imaging mode, the moving images are displayed, and the moving images are recorded every certain time (for example, one second). In parallel with recording of the images, information associating a display method displayed on a monitor with an elapsed time from the start of imaging is stored in ancillary information. When a change in the display method is instructed, a CPU 110 switches the display of a monitor 16 to set the designated display method and stores information on designation of display method in the ancillary information in the next recording.

17 Claims, 13 Drawing Sheets

DSCF0001.MPO

57

57

57

IMAGING APPARATUS AND DISPLAY APPARATUS

BACKGROUND OF THE INVENTION

1. Field of the Invention

The presently disclosed subject matter relates to an imaging apparatus and a display apparatus, and particularly, to an imaging apparatus and a display apparatus capable of photographing and reproducing a plurality of plane images in different photographing ranges.

2. Description of the Related Art

Japanese Patent Application Laid-Open No. 2006-238326 proposes a video camera in which an image taken by 3× optical zooming is displayed on a display unit when an instruction of more than 3× zooming is inputted in a camera capable of 3× optical zooming, and a range to be enlarged is surrounded by a frame by electronic zooming.

Japanese Patent Application Laid-Open No. 2004-207774 proposes a digital camera in which subject images are formed in two imaging elements in different sizes, an image taken by a larger imaging element (wide imaging element) is displayed on a display unit, and a range to be imaged by a smaller imaging element (telephoto imaging element) is indicated by surrounding the range by a frame in the image on the display unit, or in which an image taken by the wide imaging element is displayed on the entire display unit, and an image taken by the telephoto imaging element is displayed small at a corner of the display unit (first mode).

Japanese Patent Application Laid-Open No. 2004-207774 also proposes a digital camera including two display units in different sizes, and the two display units display images taken by the wide imaging element and the telephoto imaging element, respectively (second mode).

SUMMARY OF THE INVENTION

In the invention described in Japanese Patent Application Laid-Open No. 2006-238326, the zoom photographing range is displayed by a frame, and the user can recognize the zoom photographing range. However, the image actually displayed on the display unit is an image before enlargement, and there is a problem that the user cannot check the details of the image. Furthermore, the invention described in Japanese Patent Application Laid-Open No. 2006-238326 includes only one imaging element, and there is a problem that only the image after enlargement can be recorded.

In the first mode of the invention described in Japanese Patent Application Laid-Open No. 2004-207774, images photographed by the wide imaging element are mainly displayed on the display unit. Therefore, as in the invention described in Japanese Patent Application Laid-Open No. 2006-238326, there is a problem that the user cannot check the details of the images. There is also a problem that two display units are required to display two images in the second mode of the invention described in Japanese Patent Application Laid-Open No. 2004-207774. The imaging apparatus described in Japanese Patent Application Laid-Open No. 2004-207774 includes two imaging elements, and two images can be imaged and recorded. However, there is no concept of recording two images at a time.

The presently disclosed subject matter has been made in view of the foregoing circumstances, and an object of the presently disclosed subject matter is to provide an imaging apparatus and a display apparatus capable of photographing a plurality of plane images in different photographing ranges and storing display methods of the plane images along with the photographed plane images, thereby enabling to arrange a reproduction method when photographing.

To attain the object, a first aspect of the presently disclosed subject matter provides an imaging apparatus comprising: two imaging devices, each comprising an imaging optical system including a zoom lens and an imaging element in which a subject image is formed by the imaging optical system; a lens moving device that moves the zoom lenses along an optical axis direction to differentiate zoom positions of the plurality of imaging devices; a first imaging control device that consecutively acquires image signals indicating a subject from respective imaging elements of the two imaging devices to take two consecutive plane images when the zoom lenses are moved by the lens moving device; a display device that can display plane images; a first display control device that consecutively displays at least one of the two consecutive plane images taken by the first imaging control device on the display device and that displays the two plane images on the display device by at least one of: a first display method for displaying desired one of the two plane images on an entire screen of the display device and displaying the other of the two plane images on the display device in a reduced size; a second display method for displaying the two plane images side by side on the display device; and a third display method for displaying desired one of the two plane images on the entire screen of the display device; a shooting instruction input device that inputs a shooting instruction; a second imaging control device that takes two plane images through the two imaging devices in accordance with the inputted shooting instruction; and a first storage device that stores the two plane images taken by the second imaging control device in a manner associated with information indicating a display method used by the first display control device to display the two plane images just before the shooting instruction is inputted.

According to the imaging apparatus of the first aspect, once the zoom positions of the plurality of imaging devices are differentiated, the image signals indicating the subject are consecutively acquired for the imaging elements of the two imaging devices to take two consecutive plane images (imaging of live view), and the two consecutive plane images are displayed on the display device by at least one of the first display method, the second display method, and the third display method. The first display method is a display method for displaying desired one of the two plane images on the entire screen and displaying the other plane image in a reduced size. The second display method is a display method for displaying the two plane images side by side. The third display method is a display method for displaying desired one of the two plane images over the other plane image at a predetermined transmittance and changing the predetermined transmittance along with the passage of time. When the shooting instruction is inputted, two plane images are taken through the two imaging devices, and the photographed (taken) two plane images are stored in association with the information indicating the display method with which the two consecutive plane images are displayed just before the shooting instruction is inputted. As a result, the display method during live view imaging can be stored as the display method during reproduction. The two plane images taken when the shooting instruction is inputted may be still images or moving images.

A second aspect of the presently disclosed subject matter provides an imaging apparatus comprising: two imaging devices, each comprising an imaging optical system including a zoom lens and an imaging element in which a subject image is formed by the imaging optical system; a lens moving device that moves the zoom lenses in an optical axis direction to differentiate zoom positions of the plurality of imaging devices; a third imaging control device that consecutively acquires image signals indicating a subject from respective imaging elements of the two imaging devices to take two consecutive plane images after the zoom lenses are moved by the lens moving device; a display device that can display plane images; a second display control device that consecutively displays at least one of the two consecutive plane images taken by the third imaging control device on the display device and that displays the two plane images on the display device by at least one of: a first display method for displaying desired one of the two plane images on an entire screen of the display device and displaying the other of the two plane images on the display device in a reduced size; a second display method for displaying the two plane images side by side on the display device; and a third display method for displaying desired one of the two plane images on the entire screen of the display device; and a second storage device that stores the two plane images consecutively taken by the third imaging control device in a manner associated with info nation indicating the display method used by the second display control device to display the two plane images.

According to the imaging apparatus of the second aspect, once the zoom positions of the plurality of imaging devices are differentiated, the image signals indicating the subject are consecutively acquired for the imaging elements of the two imaging devices to take two consecutive plane images, and the two consecutive plane images are displayed on the display device by at least one of the first display method, the second display method, and the third display method. The consecutively taken two plane images and the information indicating the display method with which the consecutively taken two plane images are displayed are stored in a manner associated with each other. As a result, the display method during moving image shooting can be stored as the display method during moving image reproduction.

According to a third aspect of the presently disclosed subject matter, in the imaging apparatus according to the second aspect, the second storage control device stores two plane images taken within a predetermined duration and information indicating the display method used by the second display control device to display the two plane images when a predetermined time has passed in a manner associated with each other, every time the predetermined time passes.

In the imaging apparatus of the third aspect, the two plane images consecutively taken within the predetermined time and the information indicating the display method for displaying the consecutively taken two plane images are associated with each other and then stored, every time the predetermined time passes. As a result, the display method during moving image shooting can be stored in real time as the display method during moving image reproduction.

According to a fourth aspect of the presently disclosed subject matter, the imaging apparatus according to the first, second, or third aspect, further comprises a first designation device that designates desired one of the first display method, the second display method, and the third display method, and the display control device displays the two plane images on the display device by the designated display method. In the imaging apparatus of the fourth aspect, when desired one of the first display method, the second display method, and the third display method is designated during live view imaging or moving image shooting, the live view or the moving images are displayed by the designated display method. As a result, the display method can be switched according to the operation by the user.

According to a fifth aspect of the presently disclosed subject matter, in the imaging apparatus according to any one of the first to fourth aspects, the first storage control device and the second storage control device store the two plane images in one file.

In the imaging apparatus of the fifth aspect, two plane images are stored in one file. Therefore, scattering of the two plane images can be prevented. Furthermore, the relationship between two images can be easily understood when the file is outputted to another display device.

According to a sixth aspect of the presently disclosed subject matter, in the imaging apparatus according to the fifth aspect, the first storage control device and the second storage control device store the information indicating the display method in ancillary information of the one file.

In the imaging apparatus of the sixth aspect, two plane images are stored in one file, and the information indicating the display method is stored in the ancillary information of the file. As a result, resampling is not required to rewrite the information indicating the display method, and rewriting of the information indicating the display method is facilitated.

A seventh aspect of the presently disclosed subject matter provides a display apparatus comprising: an acquisition device that acquires the two plane images stored by the imaging apparatus according to any one of the first to sixth aspects and the information indicating the display method associated with the two plane images; a display device that displays the acquired two plane images; and a display control device that displays the two plane images on the display device by the display method associated with the two plane images based on the information indicating the display method.

In the display apparatus of the seventh aspect, the two plane images and the information indicating the display method associated with the two plane images are acquired, and the two plane images are displayed on the display device by the display method associated with the two plane images. As a result, the two plane images can be displayed by the display method during live view imaging or moving image shooting.

According to an eighth aspect of the presently disclosed subject matter, the display apparatus according to the seventh aspect, further comprises a designation device that designates desired one of the first display method, the second display method, and the third display method, and the display control device displays the two plane images by the display method designated by the designation device.

In the display apparatus of the eighth aspect, when desired one of the first display method, the second display method, and the third display method is designated, two plane images are displayed by the designated display method. As a result, the display method can be switched according to the operation by the user.

According to a ninth aspect of the presently disclosed subject matter, the display apparatus according to the eighth aspect, further comprises a storage device that stores the acquired two plane images and the information indicating the display method associated with the two plane images and that stores the information indicating the display method designated by the designation device, in place of the information indicating the display method associated with the two plane images, in association with the two plane images if the display method is designated by the designation device.

In the display apparatus of the ninth aspect, the acquired two plane images and the information indicating the display method associated with the two plane images are stored. When the desired display method is designated, the information indicating the designated display method is stored in association with the two plane images in place of the information indicating the display method associated with the two plane images. As a result, the two plane images can be displayed by the designated display method from the next display. Therefore, the user can arrange the displayed screen, the screen transition, etc. during reproduction.

According to a tenth aspect of the presently disclosed subject matter, in the display apparatus according to the ninth aspect, the acquisition device acquires consecutively taken images as the two plane images, and the storage device stores two plane images displayed on the display device within a predetermined duration in a manner associated with information indicating the display method used by the display control device to display the two plane images when a predetermined time has passed, every time the predetermined time passes.

In the display apparatus of the tenth aspect, when consecutively taken images are acquired as the two plane images, the two plane images displayed within the predetermined duration and the information indicating the display method with which the two plane images are displayed when the predetermined time has passed are associated with each other and stored, every time the predetermined time passes. As a result, not only the display method, but also the time of the designation of the display method can be stored. More specifically, the image reproduced when the change in the display method is instructed and the designated display method can be stored in a manner associated with each other. In other words, the arrangement result of the display screen, the screen transition, etc. can be stored in real time. Therefore, the display method can be changed when the image reproduced when the change in the display method is instructed is displayed.

According to the presently disclosed subject matter, a plurality of plane images in different photographing ranges can be photographed, and information indicating display methods of the plane images can be stored along with the photographed plane images to arrange a reproduction method during imaging.

DETAILED DESCRIPTION OF THE PREFERRED EMBODIMENTS

Hereinafter, the preferred embodiments for carrying out a compound-eye imaging apparatus according to the presently disclosed subject matter will be described in detail with reference to the attached drawings.

First Embodiment

Figure 1A:
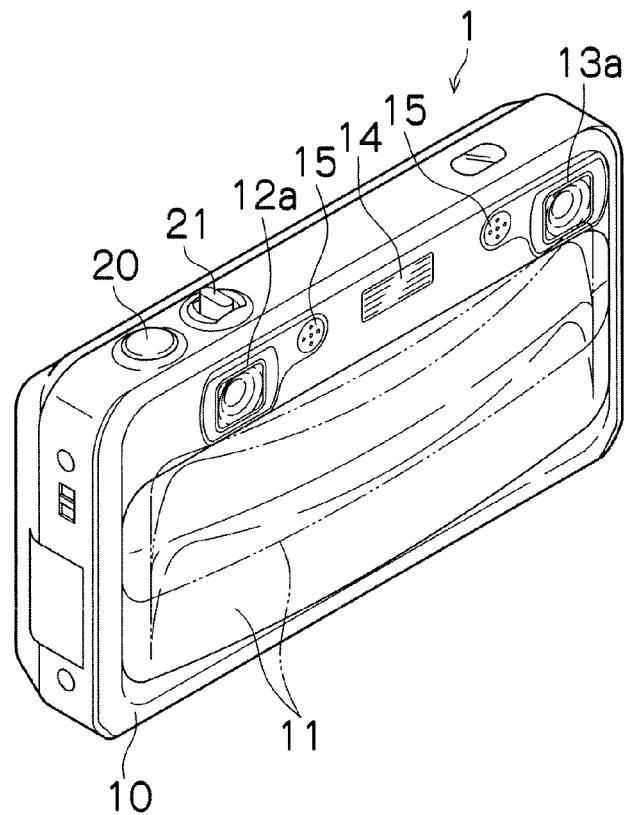
FIGS. 1A and 1B are schematic diagrams of a compound-eye digital camera 1 of a first embodiment of the presently disclosed subject matter, FIG. 1A being a front view, FIG. 1B being a back view.
Figure 1B:
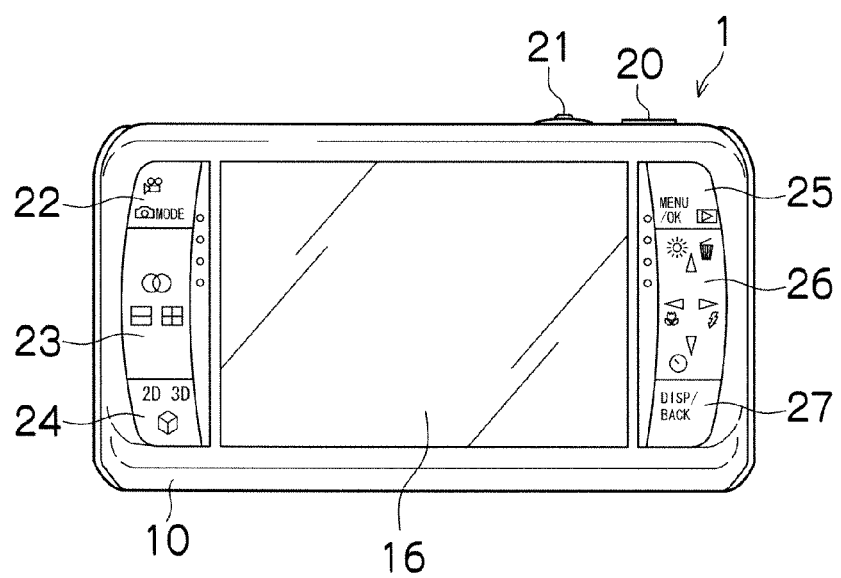

FIGS. 1A and 1B are schematic diagrams of a compound-eye digital camera 1 as the compound-eye imaging apparatus according to the presently disclosed subject matter. FIG. 1A is a front view, and FIG. 1B is a back view. The compound-eye digital camera 1 includes a plurality of (two are illustrated in FIGS. 1A and 1B) imaging systems, and the compound-eye digital camera 1 is capable of taking a stereoscopic image depicting a single subject from a plurality of viewpoints (left and right two viewpoints are illustrated in FIGS. 1A and 1B) as well as a single-viewpoint image (two-dimensional image). The compound-eye digital camera 1 can record and reproduce not only still images but also moving images and sound.

A camera body 10 of the compound-eye digital camera 1 is formed in a substantially rectangular-solid-box shape. As shown in FIG. 1A, a barrier 11, a right imaging system 12, a left imaging system 13, a flash 14, and a microphone 15 are mainly arranged on the front side of the camera body 10. A release switch 20 and a zoom button 21 are mainly arranged on the upper surface of the camera body 10.

Meanwhile, as shown in FIG. 1B, a monitor 16, a mode button 22, a parallax adjustment button 23, a 2D/3D switch button 24, a MENU/OK button 25, arrow buttons 26, and a DISP/BACK button 27 are arranged on the back side of the camera body 10.

The barrier 11 is slidably mounted on the front side of the camera body 10, and vertical sliding of the barrier 11 switches an open state and a closed state. The barrier 11 is usually positioned at the upper end, i.e. in the closed state, as shown by a dotted line in FIG. 1A, and the barrier 11 covers objective lenses 12a, 13a, etc. This prevents damage of the lenses, etc. As the barrier 11 is slid, the lenses, etc. arranged on the front side of the camera body 10 are exposed when the barrier is positioned at the lower end, i.e. the open state (see a solid line of FIG. 1A). When a sensor not shown recognizes that the barrier 11 is in the open state, a CPU 110 (see FIG. 2) turns on the power, and imaging becomes possible.

Figure 2:
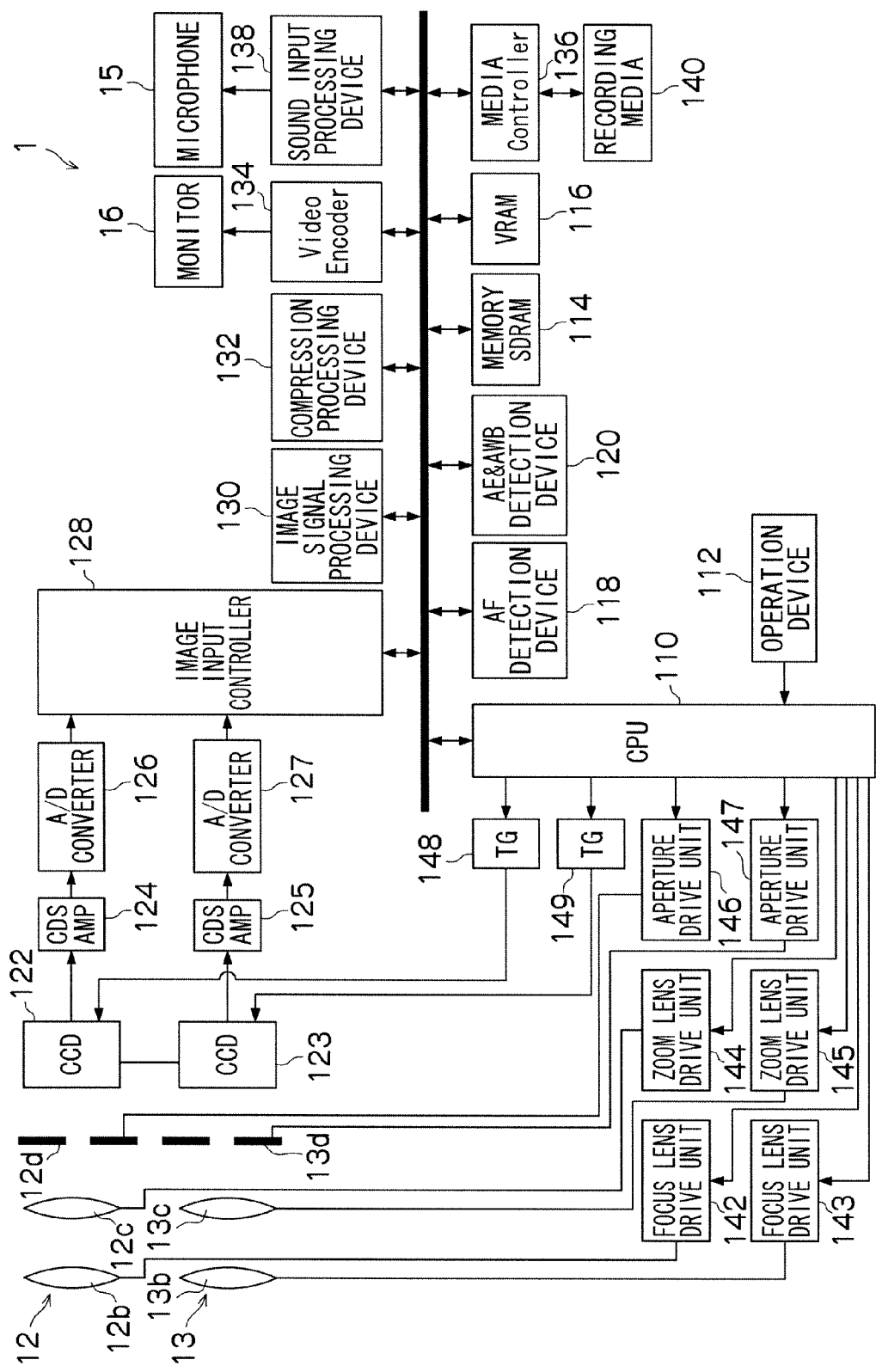
FIG. 2 is a block diagram showing an electric configuration of the compound-eye digital camera 1.

The right imaging system 12 that takes an image for right eye and the left imaging system 13 that takes an image for left eye are optical units including imaging lens groups with bending optical systems and aperture/mechanical shutters 12d and 13d (see FIG. 2). The imaging lens groups of the right imaging system 12 and the left imaging system 13 are mainly constituted by the objective lenses 12a and 13a that import light from a subject, prisms (not shown) that bend a path of the light entered from the objective lenses substantially perpendicularly, zoom lenses 12c and 13c (see FIG. 2), and focus lenses 12b and 13b (see FIG. 2).

The flash 14 is constituted by a xenon tube, and the flash 14 emits light as necessary when a dark subject is imaged, during backlight, etc.

The monitor 16 is a liquid crystal monitor that has a typical aspect ratio of 4:3 and that is capable of color display. The monitor 16 can display stereoscopic images and plane images. Although a detailed configuration of the monitor 16 is not illustrated, the monitor 16 is a parallax-barrier 3D monitor including a parallax barrier display layer on the surface. The monitor 16 is used as a user interface display panel for various setting operations and is used as an electronic viewfinder during shooting.

The monitor 16 can switch a mode for displaying a stereoscopic image (3D mode) and a mode for displaying a plane image (2D mode). In the 3D mode, a parallax barrier including a pattern, in which light transmission sections and light shielding sections are alternately arranged at a predetermined pitch, is generated on the parallax barrier display layer of the monitor 16, and strip-shaped image pieces representing left and right images are alternately arranged and displayed on an image display surface which is a layer below the parallax barrier display layer. Nothing is displayed on the parallax barrier display layer when the monitor 16 is in the 2D mode or used as the user interface display panel, and one image is displayed on the image display surface below the parallax barrier display layer.

The monitor 16 is not limited to the parallax barrier system, and a lenticular system, an integral photography system using a microlens array sheet, a holography system using an interference phenomenon, etc. may also be implemented. The monitor 16 is not limited to the liquid crystal monitor, and an organic EL, etc. may also be implemented.

The release switch 20 is constituted by a two-stroke switch including so-called "half-press" and "full-press". When the release switch 20 is half-pressed during still image shooting (for example, when a still image shooting mode is selected by the mode button 22, or when the still image shooting mode is selected from the menu), the compound-eye digital camera 1 executes shooting preparation processes, i.e. AE (Automatic Exposure), AF (Auto Focus), and AWB (Automatic White Balance). When the release switch 20 is full-pressed, the compound-eye digital camera 1 executes a shooting/recording process of an image. The compound-eye digital camera 1 starts taking moving images when the release switch 20 is full-pressed during moving image shooting (for example, when a moving image shooting mode is selected by the mode button 22, or when the moving image shooting mode is selected from the menu) and ends shooting when the release switch 20 is full-pressed again.

The zoom button 21 is used for zoom operations of the right imaging system 12 and the left imaging system 13 and is constituted by a zoom tele button 21T for instructing zooming to the telephoto side and a zoom wide button 21W for instructing zooming to the wide-angle side.

The mode button 22 functions as a shooting mode setting device that sets a shooting mode of the digital camera 1, and the shooting mode of the digital camera 1 is set to various modes based on the setting position of the mode button 22. The shooting mode is classified into a "moving image shooting mode" for taking moving images and a "still image shooting mode" for taking still images. The "still image shooting mode" includes, for example, an "auto shooting mode" in which the digital camera 1 automatically sets an aperture, a shutter speed, etc., a "face extraction shooting mode" for extracting and shooting the face of a person, a "sport shooting mode" suitable for shooting moving bodies, a "landscape shooting mode" suitable for shooting landscapes, a "night view shooting mode" suitable for shooting evening views and night views, an "aperture-prioritized shooting mode" in which the user sets the scale of the aperture and the digital camera 1 automatically sets the shutter speed, a "shutter speed-prioritized shooting mode" in which the user sets the shutter speed and the digital camera 1 automatically sets the scale of the aperture, and a "manual shooting mode" in which the user sets the aperture, the shutter speed, etc.

The parallax adjustment button 23 is a button for electronically adjusting the parallax during stereoscopic shooting. When the upper side of the parallax adjustment button 23 is pressed, the parallax between an image taken by the right imaging system 12 and an image taken by the left imaging system 13 increases by a predetermined distance. When the lower side of the parallax adjustment button 23 is pressed, the parallax between the image taken by the right imaging system 12 and the image taken by the left imaging system 13 decreases by a predetermined distance.

The 2D/3D switch button 24 is a switch for instructing switching of the 2D shooting mode for taking a single-viewpoint image and the 3D shooting mode for taking a multi-viewpoint image.

The MENU/OK button 25 is used for invocation (MENU function) of a screen for various settings (menu screen) of functions of shooting and reproduction and is used for confirmation of selection, instruction of execution of a process, etc. (OK function). All adjustment items included in the compound-eye digital camera 1 are set by the MENU/OK button 25. When the MENU/OK button 25 is pressed during shooting, a setting screen for image quality adjustment, etc. of exposure value, hue, ISO sensitivity, the number of recorded pixels, etc. is displayed on the monitor 16. When the MENU/OK button 25 is pressed during reproduction, a setting screen for deletion of an image, etc. is displayed on the monitor 16. The compound-eye digital camera 1 operates according to the conditions set on the menu screen.

The arrow buttons (cross button) 26 are buttons for setting and selecting various menus, or for zooming. The arrow buttons 26 can be pressed and operated in vertical and horizontal four directions, and a function corresponding to the setting state of the camera is allocated to the button in each direction. For example, a function for switching ON/OFF of a macro function is allocated to the left button during shooting, and a function for switching a flash mode is allocated to the right button. A function for switching the brightness of the monitor 16 is allocated to the up button, and a function for switching ON/OFF or the time of a self-timer is allocated to the down button. A function for advancing the frame is allocated to the right button during reproduction, and a function for rewinding the frame is allocated to the left button. A function for deleting an image being reproduced is allocated to the up button. A function for moving the cursor displayed on the monitor 16 in the directions of the buttons is allocated during various settings.

The DISP/BACK button 27 functions as a button for instructing switching of display of the monitor 16. When the DISP/BACK button 27 is pressed during shooting, the display of the monitor 16 switches ON→framing guide display→OFF. When the DISP/BACK button 27 is pressed during reproduction, the display switches normal reproduction→reproduction without character display→multi-reproduction. The DISP/BACK button 27 also functions as a button for canceling the input operation and instructing restoration of the previous operation state.

FIG. 2 is a block diagram showing a main internal configuration of the compound-eye digital camera 1. The compound-eye digital camera 1 mainly includes the CPU 110, an operation device (such as the release button 20, the MENU/OK button 25, and the arrow buttons 26) 112, an SDRAM 114, a VRAM 116, an AF detection device 118, an AE/AWB detection device 120, imaging elements 122 and 123, CDS/AMPs 124 and 125, A/D converters 126 and 127, an image input controller 128, an image signal processing device 130, a stereoscopic image signal processing unit 133, a compression/decompression processing device 132, a video encoder 134, a media controller 136, a sound input processing unit 138, recording media 140, focus lens drive units 142 and 143, zoom lens drive units 144 and 145, aperture drive units 146 and 147, and timing generators (TG) 148 and 149.

The CPU 110 comprehensively controls the entire operation of the compound-eye digital camera 1. The CPU 110 controls the operations of the right imaging system 12 and the left imaging system 13. Although the right imaging system 12 and the left imaging system 13 basically operate in conjunction, individual operations are also possible. The CPU 110 sets two image data obtained by the right imaging system 12 and the left imaging system 13 as strip-shaped image pieces and generates display image data for alternately displaying the image pieces on the monitor 16. A parallax barrier including a pattern in which light transmission sections and light shielding sections are alternately arranged at a predetermined pitch on the parallax barrier display layer is generated in the display in the 3D mode, and the strip-shaped image pieces indicating the left and right images are alternately arranged and displayed on the image display surface, which is the layer below, to enable the stereoscopic vision.

The SDRAM 114 records firmware as control programs executed by the CPU 110, various data necessary for the control, camera setting values, data of shot images, etc.

The VRAM 116 is used as a working area of the CPU 110 and as a temporary storage area of image data.

The AF detection device 118 calculates a physical quantity necessary for AF control from an inputted image signal in accordance with a command from the CPU 110. The AF detection device 118 is constituted by a right imaging system AF control circuit that performs AF control based on an image signal inputted from the right imaging system 12 and a left imaging system AF control circuit that performs AF control based on an image signal inputted from the left imaging system 13. In the digital camera 1 of the present embodiment, the AF control is performed based on the contrast of the images obtained from the imaging elements 122 and 123 (so-called contrast AF), and the AF detection device 118 calculates a focus evaluation value indicating the sharpness of the images from the inputted image signals. The CPU 110 detects a position where the focus evaluation value calculated by the AF detection device 118 is a local maximum and moves the focus lens group to the position. More specifically, the CPU 110 moves the focus lens group from the closest range to the infinity in predetermined steps, acquires the focus evaluation value at each position, sets the position with the maximum focus evaluation value as a focus position, and moves the focus lens group to the position.

The AE/AWB detection circuit 120 calculates a physical quantity necessary for AE control and AWB control from an inputted image signal in accordance with a command from the CPU 110. For example, the AE/AWB detection circuit 120 divides one screen into a plurality of areas (for example, 16×16) and calculates integrated values of R, G, and B image signals in each divided area to obtain the physical quantity necessary for the AE control. The CPU 110 detects the brightness of the subject (subject luminance) based on the integrated values obtained from the AE/AWB detection circuit 120 and calculates an exposure value suitable for shooting (shooting EV value). The CPU 110 then determines the aperture value and the shutter speed from the calculated shooting EV value and a predetermined program diagram. The CPU 110 divides one screen into a plurality of areas (for example, 16×16) and calculates an average integrated value of each color of R, G, and B image signals in each divided area to obtain the physical quantity necessary for the AWB control. The CPU 110 obtains ratios of R/G and B/G in each divided area from the obtained integrated values of R, integrated values of B, and integrated values of G and determines the light source type based on distributions of the obtained values of R/G and B/G in color spaces of R/G and B/G, etc. The CPU 110 then determines a gain value for the R, G, and B signals of the white balance adjustment circuit (white balance correction value) to set the values of the ratios to, for example, about 1 (i.e. integration ratio of RGB in one screen is R:G:B≅1:1:1) in accordance with a white balance adjustment value suitable for the determined light source type.

The imaging elements 122 and 123 are constituted by color CCDs including R, G, and B color filters in a predetermined color filter arrangement (for example, honeycomb arrangement or Bayer arrangement). The imaging elements 122 and 123 receive subject light formed by the focus lenses 12b and 13b, the zoom lenses 12c and 13c, etc. Photodiodes arranged on the light receiving surface convert the light entered into the light receiving surface to signal charge in an amount corresponding to the incident light amount. As for the optical charge storage/transfer operations of the imaging elements 122 and 123, the electronic shutter speeds (optical charge storage times) are determined based on charge discharge pulses inputted from the TGs 148 and 149, respectively.

More specifically, if the charge discharge pulses are inputted to the imaging elements 122 and 123, the charge is discharged without being stored in the imaging elements 122 and 123. On the other hand, if the charge discharge pulses are not inputted to the imaging elements 122 and 123 anymore, the charge is not discharged. Therefore, charge storage, i.e. exposure, is started in the imaging elements 122 and 123. The imaging signals acquired by the imaging elements 122 and 123 are outputted to the CDS/AMPs 124 and 125 based on drive pulses provided from the TGs 148 and 149.

The CDS/AMPs 124 and 125 apply a correlated double sampling process (process of obtaining accurate pixel data by calculating a difference between a field through component level and a pixel signal component level included in an output signal of each pixel of the imaging elements to reduce noise (particularly, thermal noise), etc. included in the output signal of the imaging element) to image signals outputted from the imaging elements 122 and 123 to amplify the image signals to generate analog image signals of R, G, and B.

The A/D converters 126 and 127 convert the analog image signals of R, G, and B generated by the CDS/AMPs 124 and 125 to digital image signals.

The image input controller 128 including a line buffer of a predetermined capacity stores image signals of one image outputted from the CDS/AMP/AD converters in accordance with a command from the CPU 110 and records the image signals in the VRAM 116.

The image signal processing device 130 includes a synchronization circuit (processing circuit that interpolates spatial deviation of color signals associated with a color filter arrangement of a single-plate CCD to convert the color signals to a synchronization system), a white balance correction circuit, a gamma correction circuit, a contour correction circuit, a luminance/color difference signal generation circuit, etc. The image signal processing device 130 applies required signal processing to the inputted image signals in accordance with a command from the CPU 110 to generate image data (YUV data) including luminance data (Y data) and color difference data (Cr and Cb data).

The compression/decompression processing device 132 applies a compression process in a predetermined format to the inputted image data in accordance with a command from the CPU 110 to generate compressed image data. The compression/decompression processing device 132 applies a decompression process in a predetermined format to the inputted compressed image data in accordance with a command from the CPU 110 to generate uncompressed image data.

The video encoder 134 controls display to the monitor 16. More specifically, the video encoder 134 converts an image signal stored in the recording media 140, etc. to a video signal (for example, NTSC (National Television System Committee) signal, PAL (Phase Alternation by Line) signal, and SECAM (Sequential Couleur A Memorie) signal) for display on the monitor 16 to output the video signal to the monitor 16 and outputs predetermined characters and graphic information to the monitor 16 as necessary.

The media controller 136 records the image data compressed by the compression/decompression processing device 132 in the recording media 140.

An audio signal inputted to the microphone 15 and amplified by a stereo microphone amplifier not shown is inputted, and the sound input processing unit 138 applies an encoding process to the audio signal.

The recording media 140 are various recording media such as semiconductor memory cards represented by xD-Picture Card (registered trademark) and Smart Media (registered trademark), portable small hard disks, magnetic disks, optical disks, and magneto-optical disks that can be attached and detached to and from the compound-eye digital camera 1.

The focus lens drive units 142 and 143 move the focus lenses 12b and 13b in the optical axis direction, respectively, to change their focus positions in accordance with a command from the CPU 110.

The zoom lens drive units 144 and 145 move the zoom lenses 12c and 13c in optical axis direction, respectively, to change the focus distance in accordance with a command from the CPU 110.

The aperture/mechanical shutters 12d and 13d are driven by iris motors of the aperture drive units 146 and 147, respectively, to change the opening amounts and adjust the incident light amounts to the imaging elements 122 and 123.

The aperture drive units 146 and 147 change the opening amounts of the aperture/mechanical shutters 12d and 13d to adjust the incident light amounts to the imaging elements 122 and 123, respectively, in accordance with a command from the CPU 110. The aperture drive units 146 and 147 also open and close the aperture/mechanical shutters 12d and 13d to expose/shield the imaging elements 122 and 123, respectively, in accordance with a command from the CPU 110.

Operations of the compound-eye digital camera 1 configured this way will be described.

[Shooting Mode]

The power of the compound-eye digital camera 1 is turned on when the barrier 11 is slid from the closed state to the open state, and the compound-eye digital camera 1 is activated under the shooting mode. The 2D mode and the 3D shooting mode for taking a stereoscopic image depicting a single subject from two viewpoints can be set as the shooting mode. A normal 2D shooting mode for using only the right imaging system 12 or the left imaging system 13 to take a plane image, a tele/wide simultaneous shooting mode for taking two two-dimensional images: an image of a wide range (image of the wide side); and an image of a significantly zoomed up subject (image of the telephoto side), etc., can be set as the 2D mode. The shooting mode can be set from the menu screen displayed on the monitor 16 by pressing the MENU/OK button 25 when the compound-eye digital camera 1 is driven in the shooting mode.

(1) Normal 2D Shooting Mode (1-1) Still Image Shooting Mode

The CPU 110 selects the right imaging system 12 or the left imaging system 13 (the left imaging system 13 in the present embodiment), and the imaging element 123 of the left imaging system 13 starts imaging for a live view image. More specifically, the imaging element 123 consecutively takes images and consecutively processes the image signals to generate image data for the live view image.

The CPU 110 sets the monitor 16 to the 2D mode, sequentially adds the generated image data to the video encoder 134 to convert the image data into a signal format for display, and outputs the signal to the monitor 16. As a result, the live view of the image captured by the imaging element 123 is displayed on the monitor 16. Although the video encoder 134 is not necessary if the input of the monitor 16 is compliant with digital signals, the image data needs to be converted to a signal format corresponding to the input specification of the monitor 16.

The user performs framing while watching the live view displayed on the monitor 16, checks the subject to be imaged, checks the image after shooting, or sets the shooting conditions.

An S1 ON signal is inputted to the CPU 110 when the release switch 20 is half-pressed during the shooting standby state. The CPU 110 detects the signal and performs AE photometry and AF control. The brightness of the subject is measured based on the integrated values, etc. of the image signals imported through the imaging element 123 during the AE photometry. The measured value (photometric value) is used to determine the aperture value and the shutter speed of the aperture/mechanical shutter 13d during the main shooting (actual shooting). At the same time, whether the emission of the flash 14 is necessary is determined based on the detected subject luminance. The flash 14 is pre-emitted if it is determined that the emission of the flash 14 is necessary, and the amount of light emission of the flash 14 during the main shooting is determined based on the reflected light.

An S2 ON signal is inputted to the CPU 110 when the release switch is full-pressed. The CPU 110 executes shooting and recording processes in response to the S2 ON signal.

The CPU 110 drives the aperture/mechanical shutter 13d through the aperture drive unit 147 based on the aperture value determined based on the photometric value and controls the charge storage time (so-called electronic shutter) in the imaging element 123 to attain the shutter speed determined based on the photometric value.

The CPU 110 sequentially moves the focus lens to lens positions corresponding to the closest range to the infinity during the AF control and acquires, from the AF detection device 118, an evaluation value obtained by integrating the high frequency components of the image signals based on the image signals in AF areas of the images imported through the imaging element 123 from each lens position. The CPU 110 obtains the lens position where the evaluation value is at the peak and performs contrast AF for moving the focus lens to the lens position.

In this case, if the flash 14 is to emit light, the flash 14 emits light based on the amount of light emission of the flash 14 obtained from the result of the pre-emission.

The subject light enters the light receiving surface of the imaging element 123 through the focus lens 13b, the zoom lens 13c, the aperture/mechanical shutter 13d, an infrared cut filter 46, an optical low-pass filter 48, etc.

The signal charges stored in the photodiodes of the imaging element 123 are read out in accordance with a timing signal applied from the TG 149, sequentially outputted from the imaging element 123 as voltage signals (image signals), and inputted to the CDS/AMP 125.

The CDS/AMP 125 applies a correlated double sampling process to a CCD output signal based on a CDS pulse and amplifies an image signal outputted from a CDS circuit based on an imaging sensitivity setting gain applied from the CPU 110.

The A/D converter 127 converts an analog image signal outputted from the CDS/AMP 125 to a digital image signal. The converted image signal (RAW data of R, G, and B) is transferred to the SDRAM (Synchronous Dynamic Access Memory) 114, and the SDRAM 114 temporarily stores the image signal.

The R, G, and B image signals read out from the SDRAM 114 are inputted to the image signal processing device 130. In the image signal processing device 130, a white balance adjustment circuit applies a digital gain to each of the R, G, and B image signals to adjust the white balance, a gamma correction circuit executes a gradation conversion process according to the gamma characteristics, and spatial deviation of the color signals associated with the color filter arrangement of the single-plate CCD is interpolated to execute a synchronization process of matching the phases of the color signals. A luminance/color difference data generation circuit further converts the synchronized R, G, and B image signals into a luminance signal Y and color difference signals Cr and Cb (YC signals), and a contour correction circuit applies an edge enhancement process to the Y signal. The YC signals processed by the image signal processing device 130 are stored in the SDRAM 114 again.

The compression/decompression processing device 132 compresses the YC signals stored in the SDRAM 114, and the YC signals are recorded in the recording media 140 as an image file in a predetermined format through the media controller 136. Data of still images are stored in the recording media 140 as an image file compliant with an Exif standard. An Exif file includes an area for storing data of main images and an area for storing data of reduced images (thumbnail images). Thumbnail images in a predetermined size (for example, 160×120 or 80×60 pixels) are generated through a thinning process of pixels and other necessary data processing for the data of the main images acquired by shooting. The thumbnail images generated this way are written in the Exif file along with the main images. Tag information, such as shooting date/time, shooting conditions, and face detection information, is attached to the Exif file.

(1-2) Moving Image Shooting Mode

When the moving image shooting mode is set by pressing the mode button 22, and the 2D shooting mode is set by the 2D/3D switch button 24, the CPU 110 selects the right imaging system 12 or the left imaging system 13 (the left imaging system 13 in the present embodiment), and the imaging element 123 of the left imaging system 13 starts shooting for live view image.

The CPU 110 starts taking moving images at a predetermined frame rate when the release switch 20 is full-pressed, and the CPU 110 ends taking the moving images when the release switch 20 is full-pressed again. The AE and AF processes are continuously executed during the moving image shooting.

The images constituting the moving images are stored in the SDRAM 114 as YC signals as in the case of the still images. The YC signals stored in the SDRAM 114 are compressed by the compression/decompression processing device 132 and recorded in the recording media 140 through the media controller 136 as an image file in a predetermined format. The data of the moving images is stored in the recording media 140 as an image file in accordance with a predetermined compression format, such as MPEG2, MPEG4, and H.264 systems.

When a switch from the normal 2D shooting mode to another shooting mode (transition of shooting mode) is inputted, the CPU 110 determines whether the shooting mode after transition is the tele/wide simultaneous shooting mode or the 3D shooting mode. The CPU 110 retains the 2D mode of the monitor 16 before starting the process of the other shooting mode if the shooting mode after transition is the tele/wide simultaneous shooting mode and switches the monitor 16 to the 3D mode before starting the process of the other shooting mode if the shooting mode after transition is the 3D mode.

(2) Tele/Wide Simultaneous Shooting Mode (2-1) Still Image Shooting Mode

Figure 3:
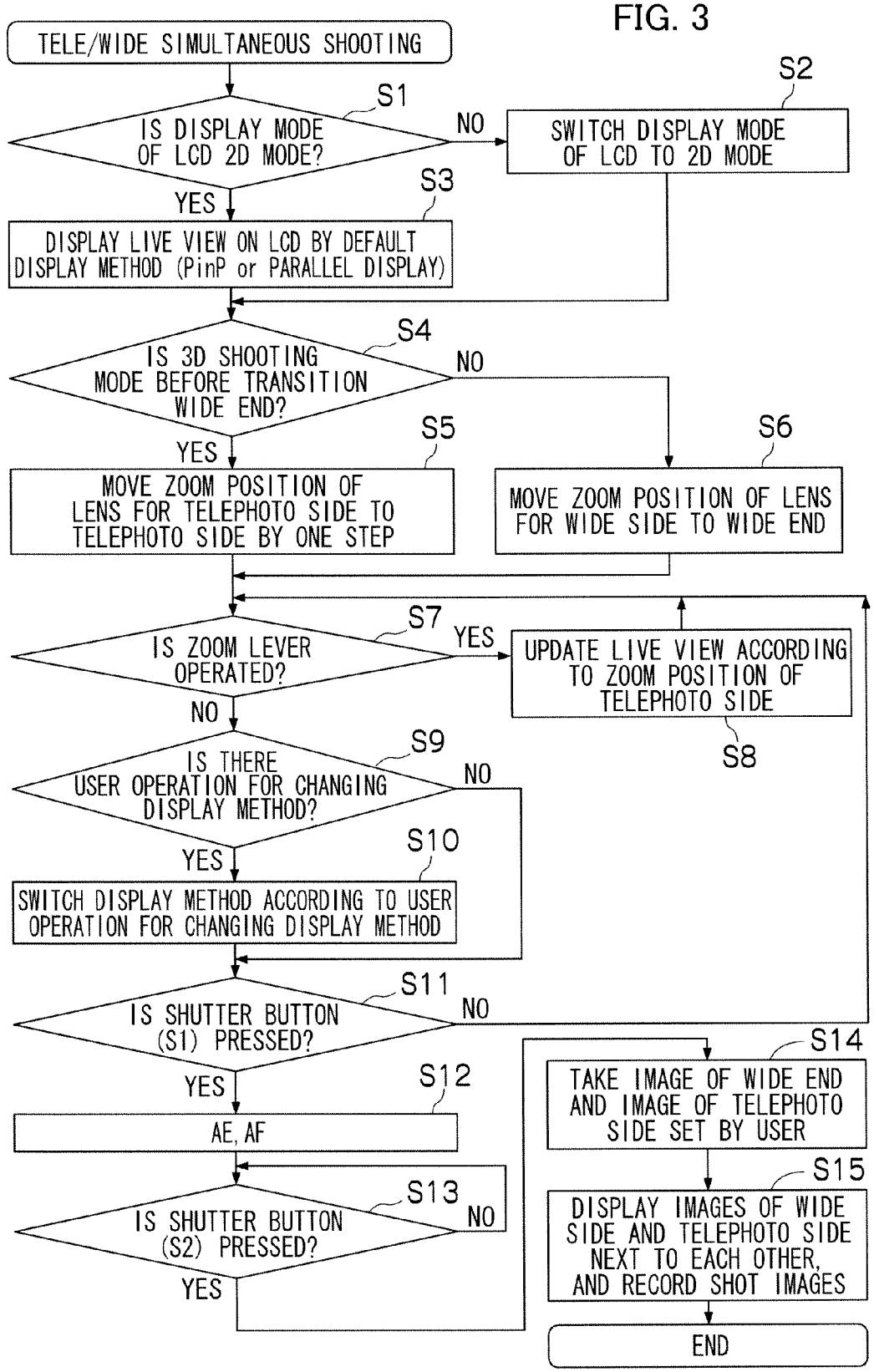
FIG. 3 is a flow chart showing a flow of a shooting process of still images in a tele/wide simultaneous shooting mode.

FIG. 3 is a flow chart showing a flow of a shooting process of still images in the tele/wide simultaneous shooting mode. In the following description, it is assumed that the right imaging system 12 takes an image of the wide side and that the left imaging system 13 takes an image of the telephoto side. Obviously, the right imaging system 12 may take an image of the telephoto side, and the left imaging system 13 may take an image of the wide side.

When the tele/wide simultaneous shooting mode is set, the right imaging system 12 and the left imaging system 13 start imaging for live view image. More specifically, the imaging elements 122 and 123 consecutively take images and consecutively process the images to generate image data for live view image. If the photographing ranges (angles of view after zooming) of the imaging elements 122 and 123 are different, the brightness of the lens of the right imaging system 12 and the brightness of the lens of the left imaging system 13 are different due to the difference in the zoom angles of view. Furthermore, if the zoom angles of view are different, it is difficult to appropriately adjust the flash for two subjects by one flash emission because the subjects imaged by the imaging elements 122 and 123 are different. Therefore, the CPU 110 may prohibit the emission of the flash 14 when the tele/wide simultaneous shooting mode is set. This can prevent problems, such as highlight clipping due to an excessively bright subject as a result of the irradiation of the flash.

The CPU 110 determines whether the monitor 16 is in the 2D mode (step S1). If the monitor 16 is not in the 2D mode (NO in step S1), the CPU 110 switches the monitor 16 from the 3D mode to the 2D mode (step S2) and outputs image data for live view image taken by at least one of the right imaging system 12 and the left imaging system 13 by an initially set display method to the monitor 16 through the video encoder 134 (step S3). If the monitor 16 is in the 2D mode (YES in step S1), the CPU 110 outputs the image data for live view image taken by at least one of the right imaging system 12 and the left imaging system 13 by the initially set display method to the monitor 16 through the video encoder 134 (step S3).

One of a PinP (Picture in Picture) display, in which a desired image is displayed on the entire monitor 16 and another image is reduced and displayed on part of a monitor 57, and a parallel display, in which the image taken by the right imaging system 12 and the image taken by the left imaging system 13 are displayed in parallel, is initially set as the display method.

Figure 4:
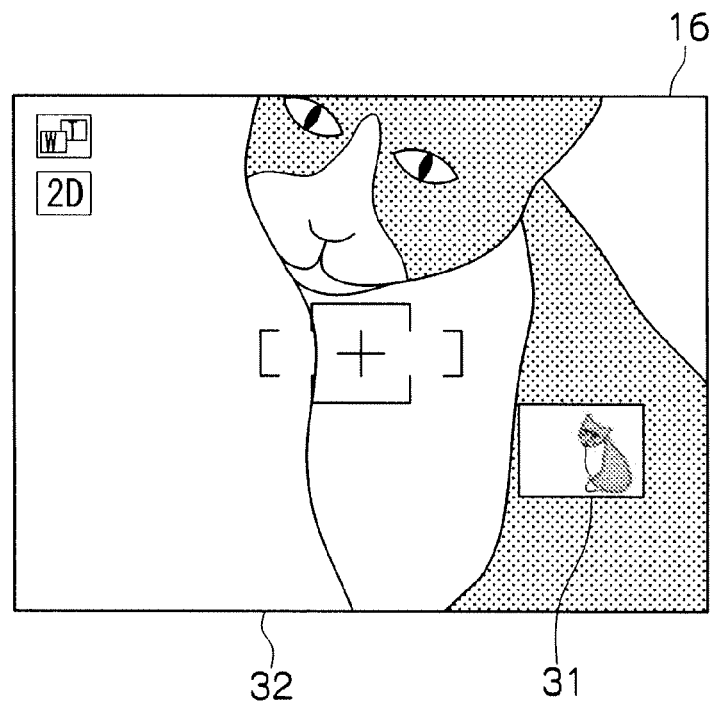
FIG. 4 is an example of a live view in the tele/wide simultaneous shooting mode.

FIG. 4 is an example of the PinP display. In FIG. 4, the CPU 110 combines and displays an image 31 of the wide side reduced at a part of the lower right side of an image 32 of the telephoto side (tele-priority). The tele-priority PinP display allows recognizing the details of the subject. There is also a configuration in which the CPU 110 combines and displays the image 32 of the telephoto side reduced at a part of the lower right side of the image 31 of the wide side (wide-priority). In FIG. 4, a target mark indicative of still image shooting is displayed substantially at the center of the monitor 16 (the target mark is not displayed in the moving image shooting mode described later). Although the reduced image is combined on the lower right side of the image displayed on the entire screen in FIG. 4, the combined position is not limited to this.

Figure 5:
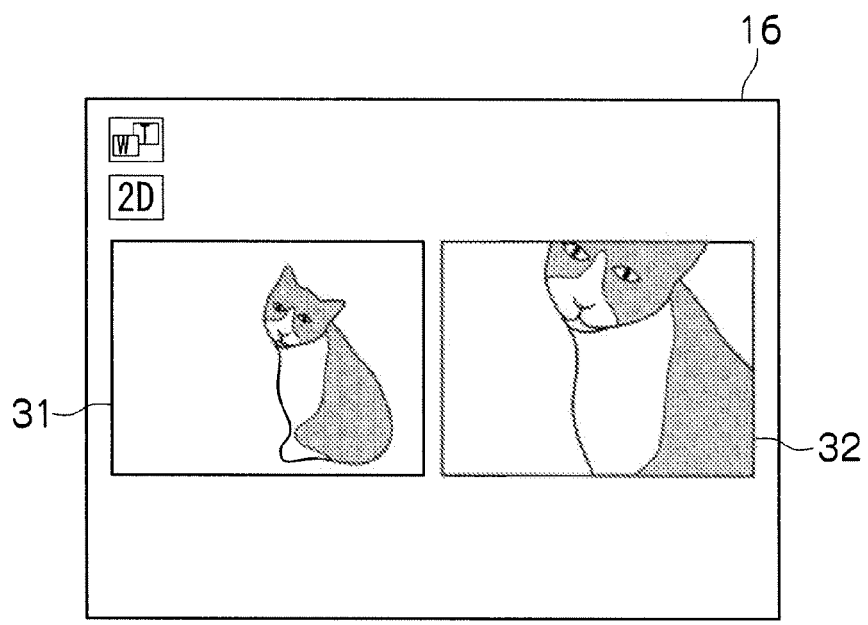
FIG. 5 is an example of a live view in the tele/wide simultaneous shooting mode.

FIG. 5 is an example of the parallel display. The CPU 110 generates images, in which the image 31 of the wide side is arranged on the left side and the image 32 of the telephoto side is arranged on the right side in the same size as the image 31, and displays the images on the monitor 16. There is also a configuration in which the image 31 of the wide side is arranged on the right side and the image 32 of the telephoto side is arranged on the left side in the same sizes.

In the present embodiment, it is assumed that the tele-priority PinP display as shown in FIG. 4 is the initially set display method. An icon indicating the tele/wide simultaneous shooting mode is displayed on the upper left of the monitor 16 in FIGS. 4 and 5. Therefore, the user can recognize that two plane images in different photographing ranges (images on the telephoto side and the wide side) are taken.

The CPU 110 determines whether the zoom positions of the right imaging system 12 and the left imaging system 13 are at the wide end (step S4). If the zoom positions of the right imaging system 12 and the left imaging system 13 are at the wide end (YES in step S4), the CPU 110 moves the zoom position of the left imaging system 13, which takes an image of the telephoto side, to the telephoto side by one step through the zoom lens drive unit 145 (step S5). If the zoom positions of the right imaging system 12 and the left imaging system 13 are not at the wide end (NO in step S4), the CPU 110 moves the zoom position of the right imaging system 12, which takes a image of the wide side, to the wide end through the zoom lens drive unit 144 (step S6). As a result, the zoom positions of the zoom lens 12c of the right imaging system 12 and the zoom lens 13c of the left imaging system 13 can be differentiated, and two images in different photographing ranges can be taken. In the present embodiment, the zoom lens 12c is positioned at the wide end, and the zoom lens 13c is positioned in the telephoto side at least by one step from the wide end.

The CPU 110 determines whether the user has operated the zoom button 21 (step S7). If the zoom button 21 is operated (YES in step S7), the CPU 110 moves the zoom position of the zoom lens 13c of the left imaging system 13 through the zoom lens drive unit 145 in accordance with the operation of the zoom button 21 and outputs the image data for live view image taken by the left imaging system 13 on the monitor 16 through the video encoder 134 (step S8). As a result, the live view displayed on the monitor 16 is updated.

A change in the display method can also be inputted during the live view imaging. If the zoom button 21 is not operated (NO in step S8), whether the user has inputted a change in the display method through the operation device 112 is determined (step S9).

If a change in the display method is inputted (YES in step S9), the CPU 110 switches the live view to set the inputted display method (step S10). In the change in the display method of step S9, one-image display for displaying only one desired image on the entire monitor 16 can be inputted in addition to the PinP display and the parallel display as the choices for the initial setting of step S3. This allows the user to arrange the display method.

The processes S9 and S10 may not be executed in the order of the flow chart, and the process of S10 may be appropriately detected and executed as a prioritized interference process.

After switching of the live view (step S10) or if a change in the display method is not inputted (NO in step S9), the CPU 110 determines whether the release switch 20 is half-pressed, i.e., whether the S1 ON signal is inputted to the CPU 110 (step S11).

If the release switch 20 is not half-pressed (NO in step S11), step S7 is executed again. If the release switch 20 is half-pressed (YES in step S11), the CPU 110 performs the AE photometry and the AF control for the right imaging system 12 and the left imaging system 13 (step S12). The AE photometry and the AF control are the same as in the normal 2D shooting mode, and the details will not be described. Once the lenses are focused, the CPU 110 terminates the lens drive of the focus lenses 12b and 13b to lock the focus.

The CPU 110 determines whether the release switch 20 is full-pressed, i.e., whether the S2 ON signal is inputted to the CPU 110 (step S13). If the release switch 20 is not full-pressed (NO in step S13), step S13 is executed again. If the release switch 20 is full-pressed (YES in step S13), the CPU 110 acquires the signal charges stored in the photodiodes of the imaging elements 122 and the 123 to generate image data (step S14). More specifically, the CPU 110 generates YC data for the image of the wide side and the image of the telephoto side and stores the YC data in the SDRAM 114. The process of generating the YC data is the same as in the normal 2D shooting mode, and the description will not be repeated. In the present embodiment, the image of the telephoto side and the image of the wide side may be exposed and processed at the same time or may be sequentially exposed and processed as long as the image data of the image of the telephoto side and the image of the wide side is acquired by one S2 ON signal input.

The CPU 110 stores the image of the wide side and the image of the telephoto side taken in step S14 in one file (step S15). More specifically, the YC signals stored in the SDRAM 114 in step S14 are compressed by the compression/decompression processing device 132 and recorded in the recording media 140 through the media controller 136 as one image file in a predetermined format.

Figure 6:
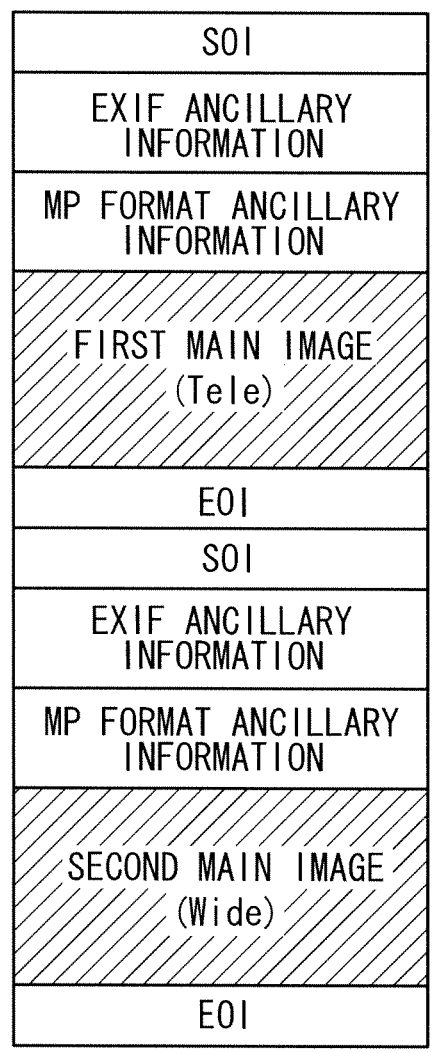
FIG. 6 is a pattern diagram showing a structure of a file storing still images taken in the tele/wide simultaneous shooting mode.

FIG. 6 is a pattern diagram showing a file format of an image file storing the images taken in the tele/wide simultaneous shooting mode. Two compressed images of the Exif standard are stored in an MP file (the extension is MPO) using an MP format capable of associating and storing the images in one file.

The MP file includes a plurality of consecutive image data that are substantially the same as a normal Exif file. In the present embodiment, the image of the telephoto side is stored first as a top image (first main image), and the image of the wide side is stored secondly as a second main image. Scattering of two images is prevented by storing two images in one same file.

Unlike the Exif file, MP format ancillary information is stored in the area following the area storing Exif ancillary information in the MP file. The MP format ancillary information includes information indicating the entire configurations of the first main image and the second main image, information specific to the first main image and the second main image, etc. In the present embodiment, the photographing ranges of the images, etc. are stored as the MP format ancillary information. This allows recognizing whether the image is an image of the telephoto side or an image of the wide side. The display method displayed on the monitor 16 just before the release switch 20 is half-pressed is stored as the MP format ancillary information. This allows storing the display method arranged by the user with the images.

Thumbnail images, etc. are the same as in the Exif file, and the description will not be repeated.

(2-2) Moving Image Shooting Mode

Figure 7:
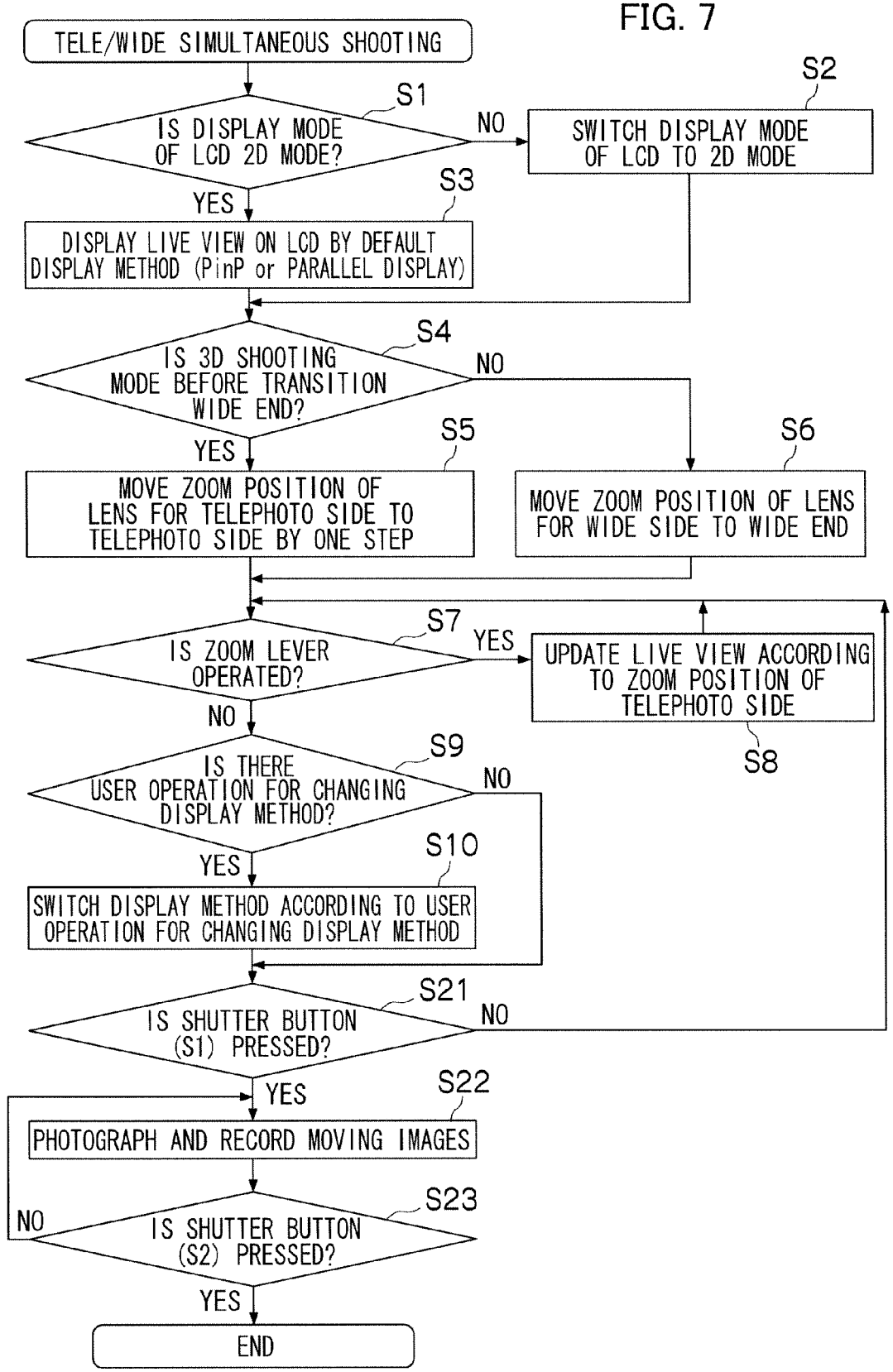
FIG. 7 is a flow chart showing a flow of a shooting process of moving images in the tele/wide simultaneous shooting mode.

FIG. 7 is a flow chart showing a flow of a shooting process of moving images in the tele/wide simultaneous shooting mode. In the following description, it is assumed that the right imaging system 12 takes images of the wide side, and the left imaging system 13 takes images of the telephoto side. Obviously, as in the case of still images, the right imaging system 12 may take images of the telephoto side, and the left imaging system 13 may take images of the wide side. The same parts (steps S1 to S10) as in the shooting of the still images are designated with the same reference numerals, and the description will not be repeated.

After switching of the live view (step S10) or if a change in the display method is not inputted (NO in step S9), the CPU 110 determines whether the release switch 20 is full-pressed, i.e., whether the S2 ON signal is inputted to the CPU 110 (step S21). The first S2 ON signal is an instruction indicating the start of recording of the moving images. If the release switch 20 is not full-pressed (NO in step S21), step S7 is executed again.

If the release switch 20 is full-pressed (YES in step S21), the CPU 110 starts shooting and recording moving images (step S22). More specifically, the CPU 110 consecutively acquires signal charges at a predetermined frame rate from the photodiodes of the imaging elements 122 and 123 to consecutively generate image data. The AE and AF processes are continuously executed during moving image shooting. The process of generating the image data is the same as in the normal 2D shooting mode, and the description will not be repeated.

The shot images of the frames are outputted to the monitor 16 during the moving image shooting. The CPU 110 displays the shot images of the frames on the monitor 16 by the tele-priority PinP display, which is the initial setting, if a change in the display method is not inputted from the initial setting and by the inputted display method if a change in the display method is inputted during live view shooting or reproduction (YES in step S9).

An operation of the zoom button 21 may be accepted during the moving image shooting. In that case, once the operation of the zoom button 21 is accepted, the CPU 110 moves the zoom position of the zoom lens 13c of the left imaging system 13 through the zoom lens drive unit 145 in accordance with the operation of the zoom button 21.

Figure 8:
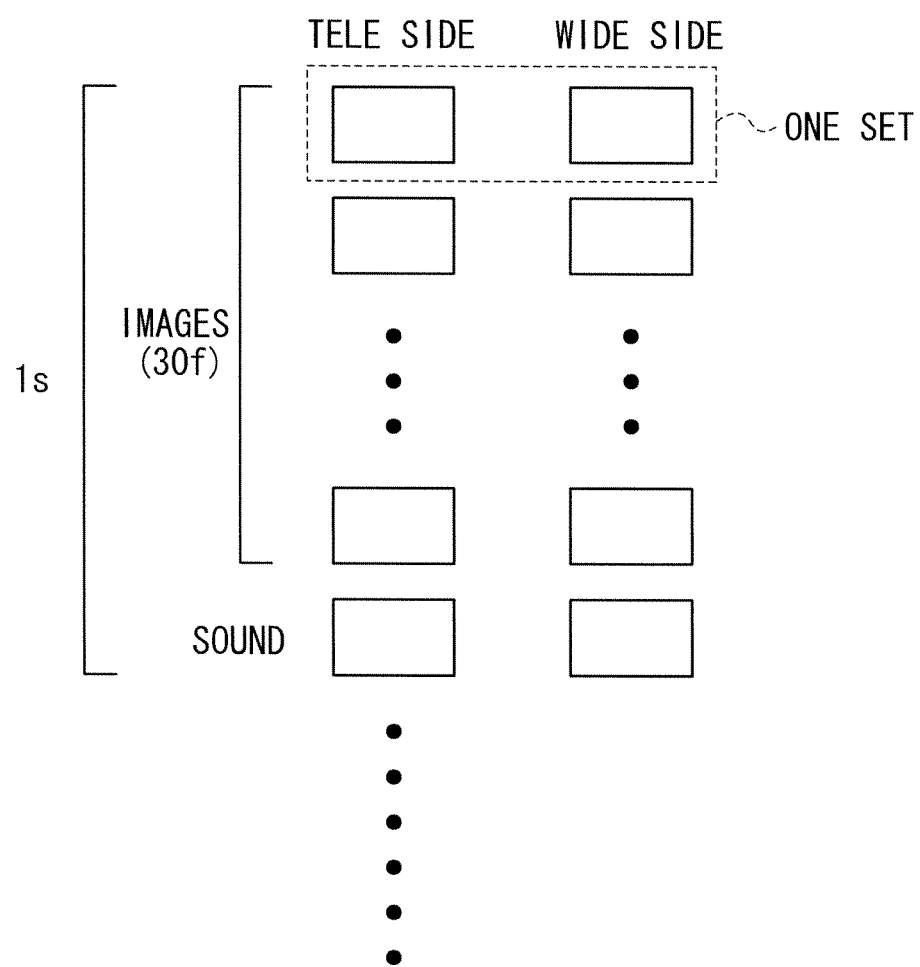
FIG. 8 is a pattern diagram showing a structure of a file storing the moving images taken in the tele/wide simultaneous shooting mode.

The CPU 110 stores the acquired images every second. FIG. 8 is a pattern diagram showing a file format of an image file storing moving images taken in the tele/wide simultaneous shooting mode.

The moving images are stored every second. Thirty frames of the images of the telephoto side and the thirty frames of the images of the wide side are taken in one second. Therefore, one combination of an image of the telephoto side and an image of the wide side is set as one set, and thirty sets are consecutively stored. Sound data of one second is then stored. In the present embodiment, the right imaging system 12 takes images of the wide side, and the left imaging system 13 takes images of the telephoto side. Therefore, images taken by the imaging element 122 of the right imaging system 12 are stored as images of the wide side, and images taken by the imaging element 123 of the left imaging system 13 are stored as images of the telephoto side. Sound inputted from the microphone 15 adjacent to the objective lens 12a of the right imaging system 12 is stored as sound of the wide side, and sound inputted from the microphone 15 adjacent to the objective lens 13a of the left imaging system is stored as sound of the telephoto side.

As the data of one second is continuously set until the end of the moving image shooting, the moving images are stored in the same file associating the images of the telephoto side and the images of the wide side. Scattering of the moving images shot using two imaging elements can be prevented by storing two images in the same file.

The display method displayed on the monitor 16 just before the moving image shooting is stored in the ancillary information of the moving image file. This allows storing the display method arranged by the user with the images. The photographing ranges, etc. of the images are also stored in the ancillary information of the moving image file. This allows recognizing whether the image is an image of the telephoto side or an image of the wide side.

The CPU 110 determines whether the release switch 20 is full-pressed again, i.e., whether the second S2 ON signal is inputted to the CPU 110 (step S23). The second S2 ON signal is an instruction for ending the moving image recording. If the release switch 20 is not full-pressed (NO in step S23), step S22 is executed again, and shooting of the moving images continues. If the release switch 20 is full-pressed (YES in step S23), shooting of the moving images ends.

Figure 9:
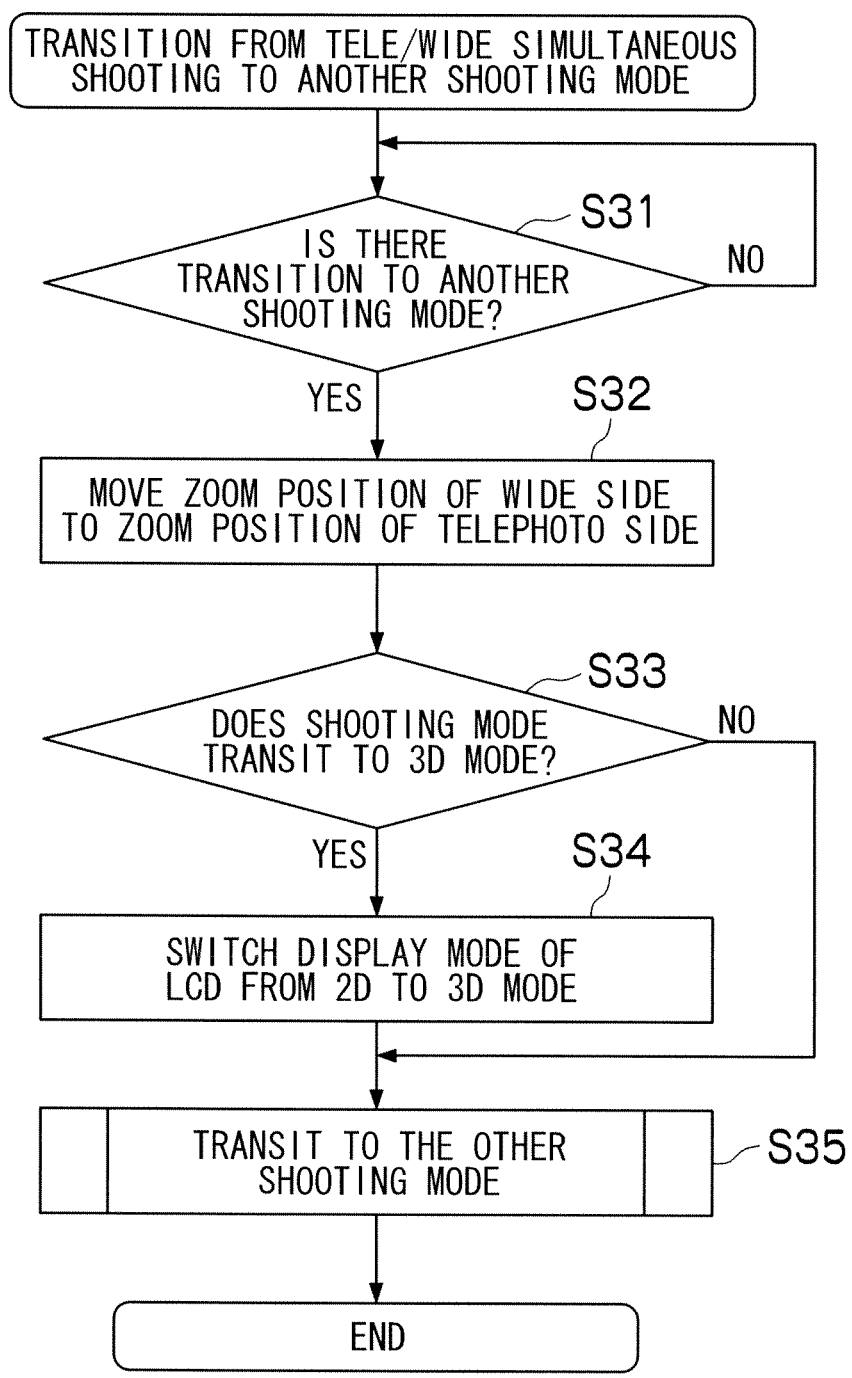
FIG. 9 is a flow chart showing a flow of a process of transition from the tele/wide simultaneous shooting mode to another shooting mode.

FIG. 9 is a flow chart showing a flow of a process during switching from the tele/wide simultaneous shooting mode to another shooting mode.

The CPU 110 determines whether the setting is changed (whether there is a transition to another shooting mode) to another shooting mode (such as normal 2D shooting mode and 3D shooting mode) as a result of an operation of the MENU/OK button 25, etc. (step S31). If there is no transition to another shooting mode (NO is step S31), step S31 is executed again.

If there is a transition to another shooting mode (YES in step S31), the CPU 110 moves the zoom position of the right imaging system 12 that takes images of the wide side to the zoom position of the left imaging system 13 that takes images of the telephoto side through the zoom lens drive unit 144 (step S32). The only shooting mode in which the zoom positions of the right imaging system 12 and the left imaging system 13 are different is the tele/wide simultaneous shooting mode. Therefore, the zoom positions of the right imaging system 12 and the left imaging system 13 need to be matched for the following processes, regardless of the shooting mode after the transition. However, since the images of the telephoto side are displayed on the monitor 16 as live view, the display of the monitor 16 changes if the zoom position of the left imaging system 13 is moved, and the user feels uncomfortable. Therefore, such a trouble can be prevented by moving the zoom position of the right imaging system 12.

The CPU 110 determines whether the shooting mode after transition is the 3D shooting mode (step S33). That is, the CPU 110 determines whether switching the shooting mode to the 3D shooting mode is instructed. If the shooting mode after transition is the 3D shooting mode (YES in step S33), the CPU 110 switches the monitor 16 to the 3D mode (step S34) and starts the process of the other shooting mode (step S35). If the shooting mode after transition is not the 3D shooting mode (NO in step S33), the CPU 110 starts the process of the other shooting mode while maintaining the 2D mode of the monitor 16 (step S35).

(3) When 3D Shooting Mode is Set (3-1) Still Image Shooting Mode

The imaging elements 122 and 123 start photographing (taking) for live view image. More specifically, the imaging elements 122 and 123 consecutively image the same subject and consecutively process the image signals to generate stereoscopic image data for live view image. The CPU 110 sets the monitor 16 to the 3D mode, and the video encoder 134 sequentially converts the generated image data to a signal format for display and outputs the image data to the monitor 16.

The generated image data is sequentially added to the video encoder 134, converted to a signal format for display, and outputted to the monitor 16. As a result, the live view of the stereoscopic image data for live view image is displayed on the monitor 16.

The user performs framing while watching the live view displayed on the monitor 16, checks the subject to be imaged, checks the image after shooting, or sets the shooting conditions.

The S1 ON signal is inputted to the CPU 110 when the release switch 20 is half-pressed during the shooting standby state. The CPU 110 detects the signal and performs AE photometry and AF control. One of the right imaging system 12 and the left imaging system 13 (the left imaging system 13 in the present embodiment) performs the AE photometry. The right imaging system 12 and the left imaging system 13 perform the AF control. The AE photometry and the AF control are the same as in the normal 2D shooting mode, and the details will not be described.

If the release switch 20 is full-pressed, the S2 ON signal is inputted to the CPU 110. The CPU 110 executes a shooting and recording process in response to the S2 ON signal. The process of generating the image data taken by the right imaging system 12 and the left imaging system 13 is the same as in the normal 2D shooting mode, and the description will not be repeated.

The data of two images generated by the CDS/AMPs 124 and 125 is recorded in storage media 137 as an MP file consecutively storing the first main image and the second main image by the same method as in the tele/wide simultaneous shooting mode. Information related to 3D images, such as angle of convergence and base length, is stored in the MP format ancillary information.

(3-2) Moving Image Shooting Mode

When the moving image shooting mode is set by pressing the mode button 22 and the 2D shooting mode is set by the 2D/3D switch button 24, the CPU 110 starts photographing for live view image by the imaging elements 122 and 123.

When the release switch 20 is full-pressed, the CPU 110 starts moving image shooting at a predetermined frame rate. When the release switch 20 is full-pressed again, the CPU 110 ends the moving image shooting. The processes of AE and AF are continuously executed during moving image shooting.

The process of generating the image data is the same as in the normal 2D shooting mode, and the description will not be repeated.

As in the case of the still images, the images constituting the moving images are stored in the SDRAM 114 as YC signals. The YC signals stored in the SDRAM 114 are compressed by the compression/decompression processing device 132 and recorded in the recording media 140 through the media controller 136 as an image file in a predetermined format. As in the tele/wide simultaneous shooting mode, the data of the moving images is recorded in the storage media 137 in one same file in which the data of two images constituting respective frames are associated. Scattering of the moving images taken using two imaging elements can be prevented by storing two images in the same file.

When switching from the 3D shooting mode to another shooting mode is inputted, the shooting mode after transition is the normal 2D shooting mode or the tele/wide simultaneous shooting mode. Therefore, the CPU 110 switches the monitor 16 to the 2D mode and starts the process of the other shooting mode.

[Reproduction Mode]

(1) Reproduction by Compound-Eye Digital Camera 1

When the mode of the compound-eye digital camera 1 is set to the reproduction mode, the CPU 110 outputs a command to the media controller 136 to cause the recording media 140 to read out the lastly recorded image file.

The compressed imaged data of the read out image file is added to a compression/decompression circuit 148, decompressed to an uncompressed luminance/color difference signal, and outputted to the monitor 16 through the video encoder 134. As a result, the image recorded in the recording media 140 is reproduced and displayed on the monitor 16 (reproduction of one image).

In the reproduction of one image, the image taken in the normal 2D shooting mode is displayed on the entire monitor 16 in the 2D mode, the image taken in the tele/wide simultaneous shooting mode is displayed by the display method stored in the MP format ancillary information, and the image taken in the 3D mode is displayed on the entire monitor 16 in the 3D mode. Similarly, in the reproduction of moving images, the images taken in the normal 2D shooting mode are displayed on the entire monitor 16 in the 2D mode, the images of the telephoto side and the images of the wide side taken in the tele/wide simultaneous shooting mode are displayed side by side, and the images taken in the 3D mode are displayed on the entire monitor 16 in the 3D mode. The images taken in the tele/wide simultaneous shooting mode are displayed by the display method stored in the ancillary information of the image file.

Frame advancing of the images is performed by left and right key operations of the arrow buttons 26. When the right key of the arrow buttons 26 is pressed, the next image file is read out from the recording media 140 and reproduced and displayed on the monitor 16. When the left key of the arrow buttons is pressed, the previous image file is read out from the recording media 140 and reproduced and displayed on the monitor 16.

The images recorded in the recording media 140 can be deleted as necessary while checking the images reproduced and displayed on the monitor 16. The images are deleted by pressing the MENU/OK button 25 when the images are reproduced and displayed on the monitor 16.

(2) Reproduction by External Display Apparatus

When the compound-eye digital camera 1 is operated in the reproduction mode while the compound-eye digital camera 1 is connected to a display apparatus 2, such as a TV, through an I/F not shown, the CPU 110 outputs the image file to the external display apparatus 2.

Figure 10:
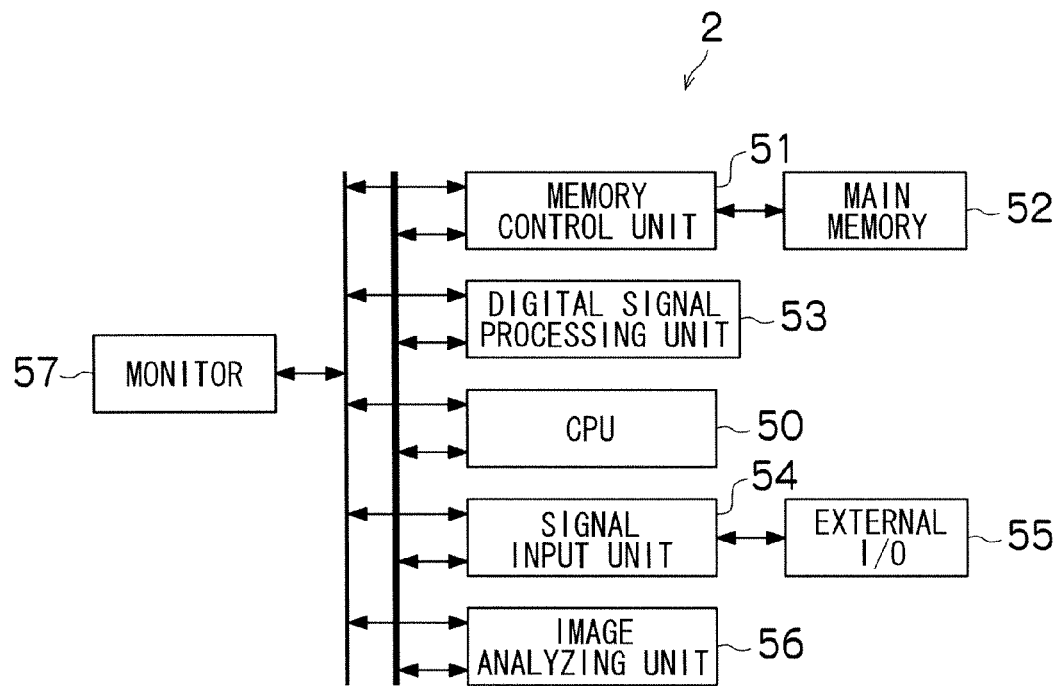
FIG. 10 is a block diagram showing an electric configuration of a display apparatus 2.

As shown in FIG. 10, the display apparatus 2 mainly comprises a CPU 50, a memory control unit 51, a main memory 52, a digital signal processing unit 53, a signal input unit 54, an external I/O (input/output unit) 55, an image analyzing unit 56, and the monitor 57.

The CPU 50 functions as a control device that comprehensively controls the entire operation of the display apparatus 2 and functions as a calculation device that executes various calculation processes. The CPU 50 includes a memory area for storing various control programs, setting information, etc. The CPU 50 executes various processes based on the programs and the setting information to control the components of the display apparatus 2.

The main memory 52 is used as a work area of the CPU 50, etc. or as a temporary storage area of image data, etc. The CPU 50 extends uncompressed image data in the main memory 52 through the memory control unit 51 to execute various processes.

The digital signal processing unit 53 converts the uncompressed image data (YC signals) generated from the image file to a video signal of a predetermined system (for example, color compound video signal of NTSC system).

The signal input unit 54 acquires the image file transmitted from the compound-eye digital camera 1 through the external I/O 55 and inputs the image file to the memory control unit 51, etc. The still images and the moving images taken in the tele/wide simultaneous shooting mode and in the 3D shooting mode are acquired as one file, and a plurality of images are not scattered.

Although an interface capable of fast interactive communication, such as SCSI (Small Computer System Interface), interactive parallel I/F, and HDMI (High Definition Multimedia Interface), is preferable for the external I/O 55, the external I/O 55 is not limited to the interactive interfaces.

The image analyzing unit 56 checks the Exif ancillary information of the image file, the MP format ancillary information, etc. to determine how the images stored in the image file are taken.

The monitor 57 is a liquid crystal panel capable of displaying a plane image, and the size of the monitor 57 allows a plurality of viewers to watch at the same time.

As an example, the processing when the images stored in the image file are still images will be described. Unlike the still images, when the stored images are moving images, an image signal is generated for each image of each frame for the moving images, and the image signals are consecutively outputted to the monitor 57. However, the display format and the generation process of the image signals are the same as for the still images and will not be described.

If the image analyzing unit 56 determines that the images stored in the image file are plane images taken in the normal 2D shooting mode, the CPU 50 outputs the image signals converted by the digital signal processing unit 53 to the monitor 57 to display the plane images on the entire liquid crystal panel 28.

If the image analyzing unit 56 determines that the images stored in the image file are images taken in the 3D mode, the CPU 50 inputs the first main image of the images included in the image file to the digital signal processing unit 53, outputs the image signal of the first main image converted by the digital signal processing unit 53 to the monitor 57, and displays the first main image of the two images on the entire liquid crystal panel 28.

If the image analyzing unit 56 determines that the images stored in the image file are images taken in the tele/wide simultaneous shooting mode, the CPU 50 displays two images (one image in some cases) on the monitor 57 by the display method designated (stored) in the ancillary information of the image file.

The CPU 50 refers to the MP format ancillary information in the case of the still images and refers to the ancillary information of the moving image file in the case of the moving images to determine the display format. The display method employed at the end of the live view imaging, i.e., the display method displayed on the monitor 16 just before shooting of still images or moving images, is stored in the ancillary information. Since the user arbitrarily inputs (selectes) the display method of the live view in accordance with the subject, the display method used here is a display method that the user has considered appropriate. Therefore, images can be displayed on the monitor 57 during image reproduction from the beginning by an appropriate display method suitable for the shooting target.

A change of the display method can be inputted (instructed or designated) from an input device (not shown) of the display device 2 after the images are displayed in the case of the still images, or during the moving image reproduction in the case of the moving images. Examples of the display method in the display device 2 include PinP display, one-image display, parallel display, and display with pseudo zoom effect.

Figure 11A:
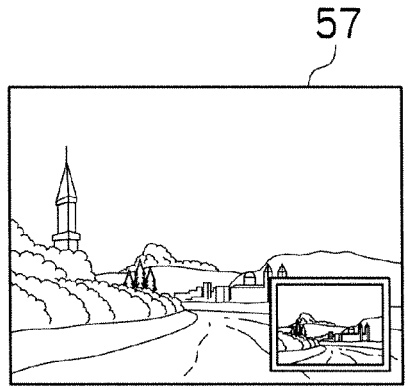
FIGS. 11A and 11B are examples of displayed images when the display device displays images taken in the tele/wide simultaneous shooting mode.
Figure 11B:
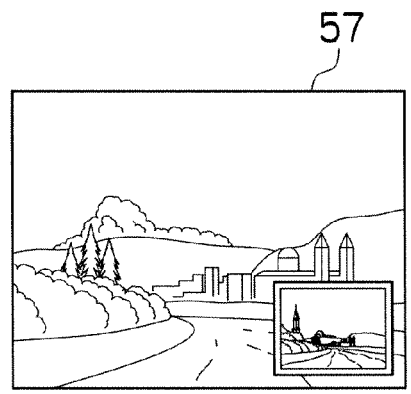

FIGS. 11A and 11B are examples of the PinP display, in which a desired image is displayed on the entire monitor 57, and the other image is reduced and displayed on a part of the monitor 57. FIG. 11A is an example of wide-priority in which an image of the wide side is displayed on the entire monitor 57. FIG. 11B is an example of tele-priority in which an image of the telephoto side is displayed on the entire monitor 57.

In the wide-priority case, the CPU 50 reduces and combines the first main image, which is an image of the telephoto side, at a lower right part of the second main image, which is an image of the wide side, and displays the combined images on the monitor 57. In the tele-priority case, the CPU 50 reduces and combines the second main image, which is an image of the wide side, at a lower right part of the first main image, which is an image of the telephoto side, and displays the combined images on the monitor 57. In the example of display, the visibility of one desired image can be improved while maintaining the relationship between two images.

Figure 12A:
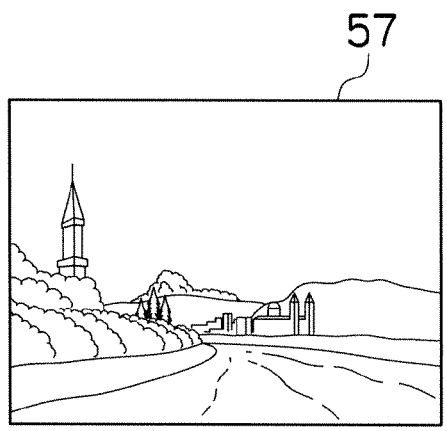
FIGS. 12A and 12B are examples of displayed images when the display device displays images taken in the tele/wide simultaneous shooting mode.
Figure 12B:
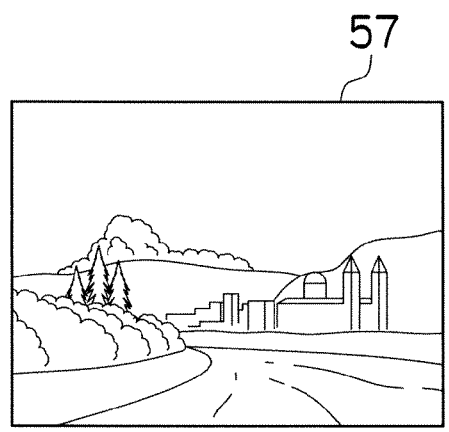

FIGS. 12A and 12B are examples of the one-image display in which a desired image is displayed on the entire monitor 57. FIG. 12A shows a wide display, and FIG. 12B shows a telephoto display. The CPU 50 outputs only the second main image, which is an image of the wide side, to the monitor 57 in the case of the wide display and outputs only the first main image, which is an image of the telephoto side, to the monitor 57 in the case of the telephoto display. In the example of display, the visibility of one desired image can be improved.

Figure 13:
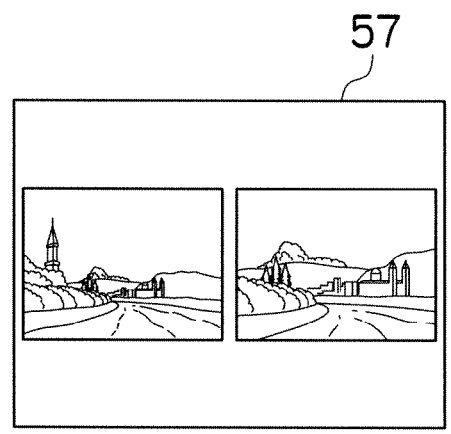
FIG. 13 is an example of a displayed image when the display device displays an image taken in the tele/wide simultaneous shooting mode.

FIG. 13 is an example of the parallel display in which the image of the telephoto side and the image of the wide side are arranged side by side. The CPU 50 generates images arranging the first main image and the second main image side by side and outputs the generated images on the monitor 57. The visibility of the images is degraded in the parallel display if the size of the monitor is small like the monitor 16 of the compound-eye digital camera 1. However, the visibility of the images can be improved while maintaining the relationship between two images if the size of the monitor is large like the monitor 57 of the display apparatus 2. Although the image of the wide side is arranged on the left side and the image of the telephoto side is arranged on the right side in FIG. 13, the image of the telephoto side may be arranged on the left side and the image of the wide side may be arranged on the right side.

Figure 14C:
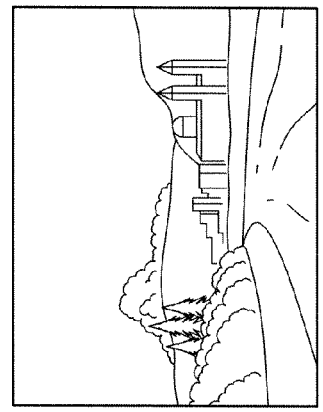
FIGS. 14A, 14B, and 14C are examples of displayed images when the display device 2 displays images taken in the tele/wide simultaneous shooting mode.
Figure 14B:
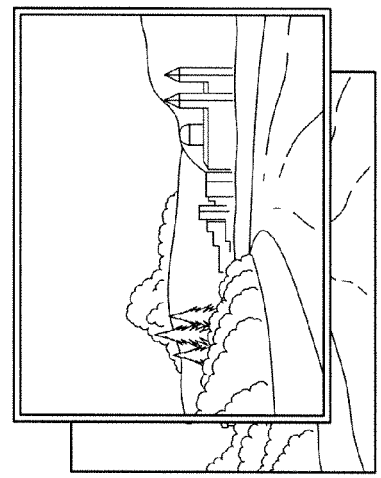
Figure 14A:
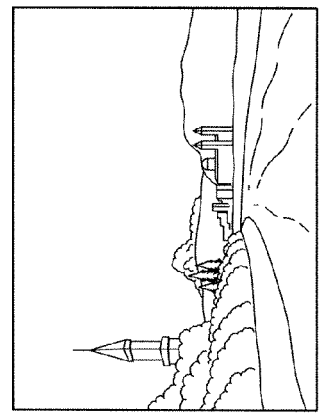

FIGS. 14A, 14B, and 14C show an example of display with a pseudo zoom effect (hereinafter, called "pseudo zoom display") in which the image of the wide side is first displayed on the entire screen, the image of the wide side is gradually replaced by the image of the telephoto side, and the image of the telephoto side is lastly displayed on the entire screen.

The CPU 50 places the image of the wide side and the image of the telephoto side on top of each other and outputs the images to the monitor 57. The CPU 50 sets the transmittance of the image of the telephoto side to 100% in the initial state. Therefore, only the image of the wide side is displayed on the monitor 57 as shown in FIG. 14A.

The CPU 50 gradually reduces the transmittance of the image of the telephoto side until the transmittance of the image of the telephoto side becomes 0%. Therefore, the image of the telephoto side and the image of the wide side are displayed on top of each other on the monitor 57 as shown in FIG. 19B. Ultimately, only the image of the telephoto side is displayed on the monitor 57 as shown in FIG. 14C. In the example of display, the visibility of the images can be improved while maintaining the relationship between two images. Furthermore, the display can be more entertaining. The image of the wide side is displayed first, and the image is gradually switched to the image of the telephoto side in FIGS. 14A to 14C. However, the image of the telephoto side may be displayed first, and the display may be gradually switched to the display of the wide side.

Unlike the still images, the image of the telephoto side and the image of the wide side are changed in parallel with the change in the transmittance when the pseudo zoom display is performed in the moving images. For example, the CPU 50 sets the transmittance of the image of the telephoto side of an X-th frame to 100%, sets the transmittance of the image of the telephoto side of an X+1-th frame to 99%, and sets the transmittance of the image of the telephoto side of an X+99-th frame to 0%.

When the display method is inputted, the CPU 50 generates images for display to be displayed on the monitor 57 by the changed display method and outputs the images to the monitor 57. This enables to display in a manner that the user desired. Particularly, changing the display method during the moving image reproduction (particularly, changing the display method to perform pseudo zoom display) can make the display more entertaining.

If the display method is inputted, the CPU 50 overwrites the ancillary information of the image file with the inputted display method and stores the information in the main memory 52. This allows displaying images by the inputted display method from the next display after the input by the user. Therefore, the user can arrange the display method to reproduce images by the arranged display method.

In the cases of the PinP display and the one-image display, a change in the image to be displayed on the entire screen can be inputted (instructed) from an input device (not shown) of the display device 2. In the case of the PinP display, the CPU 50 displays the currently displayed reduced image on the entire screen and reduces and displays the image currently displayed on the entire screen when a change in the image to be displayed on the entire screen is inputted. In the case of the one-image display, the CPU 50 displays, on the entire screen, the image which is not currently displayed between the two images of the wide side and telephoto side.

When the pseudo zoom display is performed in the moving images, whether to first display the image of the wide side and then gradually switch the image to the image of the telephoto side or to first display the image of the telephoto side and then gradually switch the image to the image of the wide side can be inputted from the input device (not shown) of the display device 2. This allows the user, to arbitrarily select whether to enlarge or reduce the images. The visibility can be improved, and the display can be more entertaining.

The CPU 50 stores the information indicating the lastly displayed display method in the MP format ancillary information of the MP file in the case of the still images and in the ancillary information of the moving image file in the case of the moving images. As a result, the user can arrange the display method. The display by the arranged display method is possible from the next display.

According to the present embodiment, not only the stereoscopic images, but also two plane images in different photographing ranges can be photographed. Two plane images in different photographing ranges can be stored in the same file. Therefore, two images are not scattered, and the relationship between two images can be easily understood even if the images are viewed by an apparatus other than the compound-eye digital camera that has taken the images.

According to the present embodiment, scattering of two plane images can be prevented when the images are viewed by a display apparatus other than the imaging apparatus, e.g. a display apparatus in a size that allows a plurality of viewers to see two plane images in different photographing ranges. The relationship between two images can be easily understood when a file is outputted to another display device.

According to the present embodiment, the display method during the moving image shooting can be stored in real time as the display method during moving image reproduction. In other words, the display method when moving image reproduction can be arranged in parallel with the moving image shooting.

According to the present embodiment, the display method can be inputted during live view imaging or during reproduction. Therefore, the images can be displayed by the user's desired display method. Furthermore, the information indicating the display method is stored in the ancillary information, such as the MP format ancillary information, and the user can arbitrarily arrange the display method. Therefore, the visibility can be improved, and the display can be more entertaining.

Although an example of the one-image display of only one set of plane images has been described as an example of displaying the still images on a display device other than the compound-eye digital camera in the present embodiment, so-called slide-show display for consecutively displaying one set of plane images is also possible. In that case, a change in the display method can be inputted (instructed) from the input device (not shown) of the display device 2 in the middle of the slide-show display. When the display method is changed in the middle of the slide-show display, the display method can be arranged for the images following the image, which is displayed on the monitor 57 when the method is changed, by storing the display method after the change in the MP format ancillary information.

The images taken in the tele/wide simultaneous shooting mode are stored in the same file in the present embodiment (both still images and moving images). However, the display apparatus, etc. that has received the file may not be able to decode the file including a plurality of images. In that case, the CPU and the image analyzing unit of the display apparatus can handle the file as a file storing only the top image. For example, if the MPO (Multi Picture Object) file cannot be decoded, the JPEG (Joint Photographic Experts Group) file can be handled as a file storing only the first main image.

The images taken in the tele/wide simultaneous shooting mode are stored in the same file in the present embodiment (both still images and moving images). However, the images may not be stored in the same file as long as the images taken in the tele/wide simultaneous shooting mode are associated. For example, in the case of the still images, two JPEG files may be created, and information indicating the association of the Exif ancillary information may be stored to associate and store two plane images. However, in this case, the display apparatus that has received the files need to analyze all Exif ancillary information, etc. to find the associated images. Therefore, it is preferable to store the images taken in the tele/wide simultaneous shooting mode in the same file.

Second Embodiment

In the first embodiment of the presently disclosed subject matter, the display method displayed on the monitor 16 just before shooting of the still images or the moving images is stored in the ancillary information of the file in which the images taken in the tele/wide simultaneous shooting mode are associated and stored. However, the display method for storing the ancillary information is not limited to this.

A second embodiment of the presently disclosed subject matter is a mode for allowing input of a display method when moving images are taken in the tele/wide simultaneous shooting mode and storing the inputted display method in real time. In a compound-eye digital camera 3 of the second embodiment, only a moving image shooting process in the tele/wide simultaneous shooting mode is different from the compound-eye digital camera 1 of the first embodiment. Therefore, only the moving image shooting process in the tele/wide simultaneous shooting mode will be described, and the other parts will not be described. The same parts as in the first embodiment are designated with the same reference numerals and will not be described.

[Shooting Mode]

Figure 15:
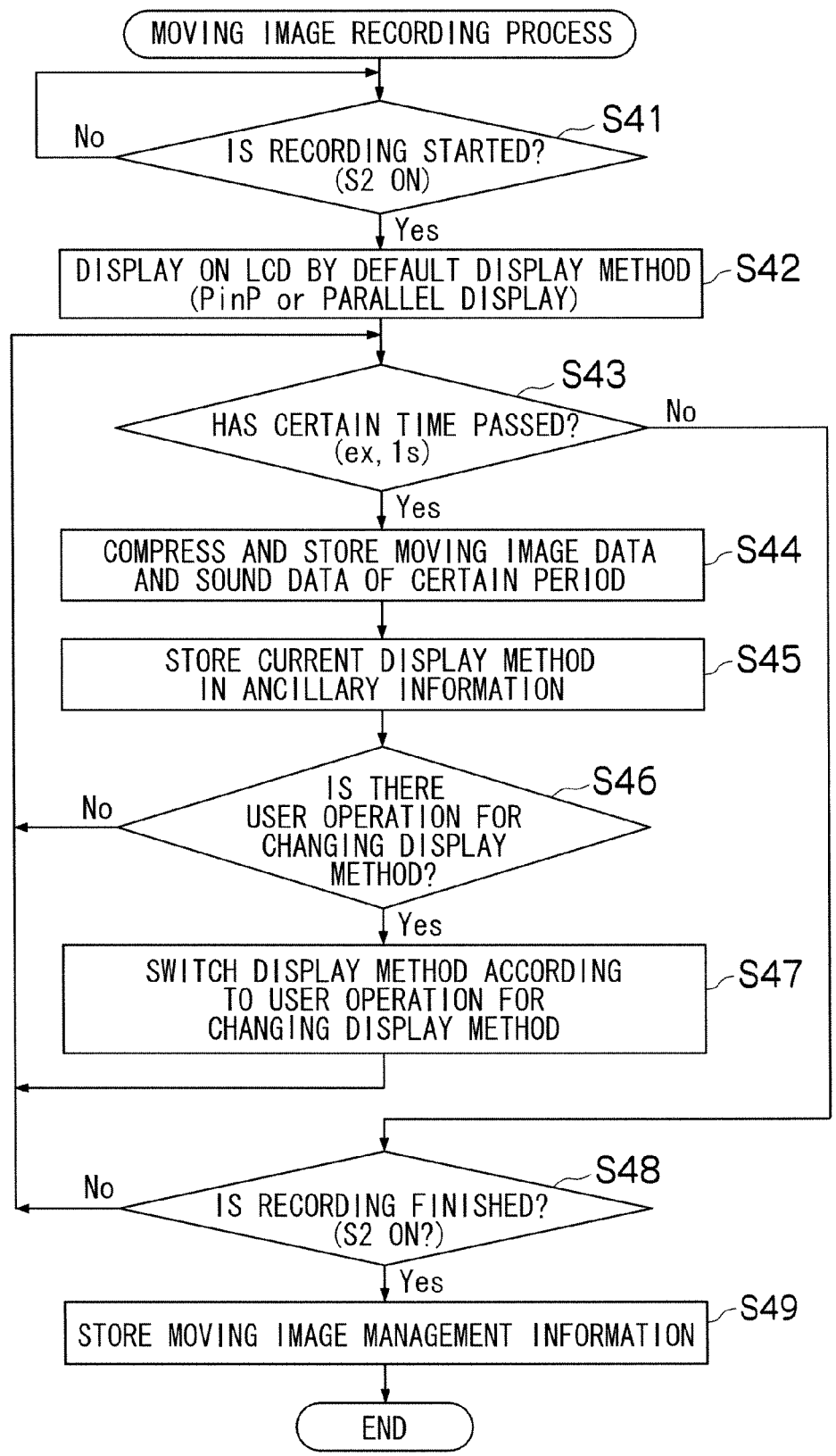
FIG. 15 is a flow chart showing a flow of a shooting process of moving images in the tele/wide simultaneous shooting mode in a compound-eye digital camera of a second embodiment of the presently disclosed subject matter.

FIG. 15 is a flow chart showing a flow of a process of shooting and recording moving images in the tele/wide simultaneous shooting mode. The flow chart starts from a state in which the live view is imaged and displayed after steps S1 to S10 (see FIG. 7) of the first embodiment.

The CPU 110 determines whether the release switch 20 is full-pressed, i.e., whether the S2 ON signal is inputted to the CPU 110 (step S41). If the release switch 20 is not full-pressed (NO in step S41), step S41 as well as shooting and reproduction of the live view are executed again.

If the release switch 20 is full-pressed (YES in step S41), an instruction of moving image shooting is inputted, and the CPU 110 starts shooting and recording moving images (step S42). More specifically, the CPU 110 consecutively acquires signal charges at a predetermined frame rate from the photodiodes of the imaging elements 122 and 123 and consecutively generates image data. The processes of AE and AF are continuously executed during moving image shooting. The generation process of the image data is the same as in the first embodiment, and the description will not be repeated.

The CPU 110 displays the shot images of the frames on the monitor 16 by the initially set display method (step S42). One of the PinP display (see FIG. 4), in which a desired image is displayed on the entire monitor 16 and another image is reduced and displayed on part of the monitor 57, and the parallel display (see FIG. 5), in which the image taken by the right imaging system 12 and the image taken by the left imaging system 13 are displayed side by side, is initially set as the display method.

The CPU 110 determines whether a certain time has passed since the start of the moving image shooting (step S43). The certain time is, for example, one second. If the certain time has passed (YES in step S43), image data and sound data of a certain period (for example, one second) are stored (step S44). If thirty frames of images of the telephoto side and thirty frames of images of the wide side are taken in one second, one combination of an image of the telephoto side and an image of the wide side is set as one set, and thirty sets are consecutively stored as shown in FIG. 8. The sound data of one second is then stored. If the right imaging system 12 takes the images of the wide side and the left imaging system 13 takes the images of the telephoto side, the images taken by the imaging element 122 of the right imaging system 12 are stored as the images of the wide side, and the images taken by the imaging element 123 of the left imaging system 13 are stored as the images of the telephoto side. The sound inputted from the microphone 15 adjacent to the objective lens 12a of the right imaging system 12 is stored as the sound of the wide side, and the sound inputted from the microphone 15 adjacent to the objective lens 13a of the left imaging system is stored as the sound of the telephoto side.

In parallel with the storage of the images, when the certain time has passed (when determined YES in step S43), the CPU 110 stores information associating the display method, which is displayed on the monitor 16, and an elapsed time from the start of shooting (start of step S42) in the ancillary information (step S45). For example, if the display method after one second from the start of shooting is the tele-priority PinP display, the CPU 110 stores the association of one second and tele-priority in the ancillary information.

The CPU 110 determines whether a change in the display method is inputted through the operation device 112 (step S46). The PinP display, the parallel display, the one-image display, and the pseudo zoom display (see FIGS. 14A to 14C) can be inputted as the display method. If a change in the display method is inputted (YES in step S46), the CPU 110 switches the display of the monitor 16 to set the inputted display method. If the display of the monitor 16 is switched to set the inputted display method (step S47) or if a change in the display method is not inputted (NO in step S46), the process returns to step S43, and it is determined whether a certain time has passed since the determination of step S43 of the last time (step S43).

The processes S46 and S47 may not be executed in the order of the flow chart, and input of the change in the display method may be appropriately detected as a prioritized interference process to execute the process of switching the display method.

If the certain time has not passed since the start of shooting for the first occasion or since the determination of the last time for the second and subsequent occasions (NO in step S43), whether the release switch 20 is full-pressed again, i.e., whether the S2 ON signal is inputted to the CPU 110 for the second time, is determined (step S48). The second S2 ON signal is an instruction indicating the end of recording of the moving images.

The operation of the zoom button 21 may be accepted during the processes of steps S43 and S48. In that case, when the operation of the zoom button 21 is accepted, the CPU 110 moves the zoom position of the zoom lens 13c of the left imaging system 13 through the zoom lens drive unit 145 in accordance with the operation of the zoom button 21.

If the release switch 20 is not full-pressed (NO in step S48), the process returns to step S43, and whether the certain time has passed since the last determination of step S43 is determined (step S43). In this way, the image data, the sound data, and the ancillary information related to the display method are added and stored every certain time. As a result, the images of the telephoto side and the images of the wide side constituting the moving images as well as the sound data and the ancillary information related to the display method are stored in the same file. The storage in the same file prevents scattering of the images taken using two imaging elements and the information related to the display method.

Figure 16:
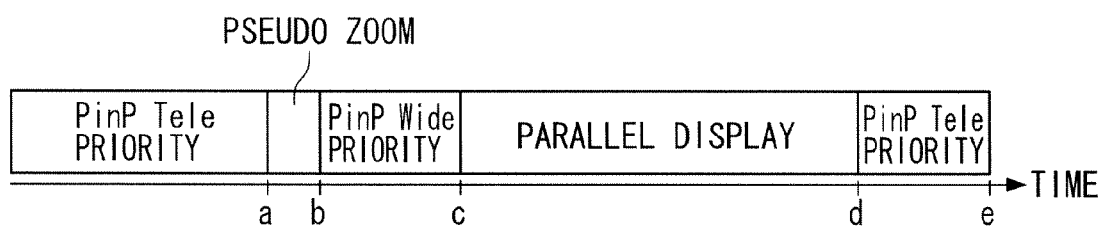
FIG. 16 is a pattern diagram showing storage of shooting time and display methods in an associated manner.

The storage of the information related to the display method every second as the ancillary information allows associating and storing the passage of time and the display method as shown for example in FIG. 16. In the case shown in FIG. 16, 0 to a seconds (0 second, 1 second, 2 second, ... a second) are stored in association with the tele-priority PinP display, a to b seconds (a second, a+1 second, ... b second) are stored in association with the pseudo zoom display, b to c seconds (b second, b+1 second, ... c second) are stored in association with the wide-priority PinP display, c to d seconds (c second, c+1 second, ... d second) are stored in association with the parallel display, and d to e seconds (d second, d+1 second, ... e second) are stored in association with the tele-priority PinP display.

In this way, the image reproduced when the change in the display method is inputted can be stored in association with the inputted display method. In the present embodiment, the data is stored every certain time, or one second. Therefore, the time of the actual input (designation) of the display method and the time of the storage in the ancillary information vary by about one second at the maximum. However, the margin of error of about one second is small when the images are viewed, and time of the actual input of the display method and the time of the storage in the ancillary information can be considered substantially the same. The interval of recording can be reduced as much as possible to match the time of the actual input of the display method and the time of the storage in the ancillary information as much as possible.

If the release switch 20 is full-pressed (YES in step S48), shooting of the moving images ends, and moving image management information is stored along with the images, the sound data, and the ancillary information (step S49).

[Reproduction Mode]

When the mode of the compound-eye digital camera 1 is set to the reproduction mode, the CPU 110 outputs a command to the media controller 136 to read out the image file recorded lastly in the recording media 140.

The CPU 110 refers to the ancillary information to acquire information related to the display method. The CPU 110 further decompresses the compressed image data of the image file to an uncompressed luminance/color difference signal and outputs the signal to the monitor 16 through the video encoder 134 to display the signal by the acquired display method.

The time and the display method are associated and stored in the ancillary information. Therefore, if 0 to a seconds are stored in association with the tele-priority PinP display, a to b seconds are stored in association with the pseudo zoom display, b to c seconds are stored in association with the wide-priority PinP display, c to d seconds are stored in association with the parallel display, and d to e seconds are stored in association with the tele-priority PinP display, the CPU 110 displays images taken in the period of 0 to a seconds by the tele-priority PinP display, displays images taken in the period of b to c seconds by the wide-priority PinP display, displays images taken in the period of c to d seconds by the parallel display, and displays images taken in the period of d to e seconds by the tele-priority PinP display. In this way, the screen can be switched during reproduction just as the user has switched the screen during shooting.

A change in the display method can also be inputted during reproduction of the moving images. When a change in the display method is inputted through the operation device 112, the CPU 110 displays the images on the monitor 16 by the changed display method from the image of the frame to be reproduced next. At the same time, the CPU 110 associates the inputted display method with the time and stores the information in the ancillary information.

For example, when c to d seconds (c second, c+1 second, ... d second) are stored in association with the parallel display, if the display method of c+x to c+y seconds (c second<c+x second<c+y second<d second) is changed to the tele-priority PinP display, the CPU 110 rewrites the ancillary information to associate c+x to c+y seconds, which is associated with the parallel display, with the tele-priority PinP display.

To store the change in the display method when the display method is not stored in the ancillary information, resampling is required. Therefore, the change in the display method is not easy. However, if the time and the display method are associated and stored in the ancillary information as in the present embodiment, only rewriting of the ancillary information is required when there is a change in the display method. Therefore, the management of the display method and the arrangement of the display are easy.

In the case of display by the external display apparatus 2, the moving images can be reproduced in the same situations as in the situations of reproduction when the moving images are stored, and the change in the display method during reproduction can be stored, as in the case of reproduction by the compound-eye digital camera 1. The reproduction method and the storage method are substantially the same as in the compound-eye digital camera 1, and the description will not be repeated.

According to the present embodiment, the display method can be arranged in parallel with shooting of the moving images. The display method is stored along with the images, and the moving images can be reproduced by the arranged reproduction method. The display method is stored in the ancillary information, and saving of the changed display method is easy.

According to the present embodiment, the display method is changed during reproduction, and the changed content is stored in the image file. Therefore, the reproduction method can also be arranged during reproduction, and the moving images can be reproduced by the arranged reproduction method from the next reproduction.

According to the present embodiment, the display method is stored in a predetermined time interval. Therefore, not only the display method, but also the time of input of the display method can be stored. More specifically, the image reproduced when the change in the display method is inputted and the inputted display method are associated and stored. Therefore, the display method can be changed when the image reproduced when the change in the display method is inputted is displayed. More specifically, the screen can be switched during reproduction just as the user has switched the screen during shooting.

The presently disclosed subject matter can be applied not only to the compound-eye digital camera with two imaging systems, but also to a compound-eye digital camera with three or more imaging systems. When the compound-eye digital camera with three or more imaging systems is used to take images in the tele/wide simultaneous shooting mode, two imaging systems may be selected, or all imaging systems may be used to take images. When all imaging systems are used to take images, two images can be used and displayed for the PinP display and the parallel display.

The presently disclosed subject matter can be applied not only to the digital camera, but also to various imaging apparatuses, such as video cameras, as well as cell phones, etc. The presently disclosed subject matter can also be provided as a program (recording medium) applied to the compound-eye digital camera, etc. Such a recording medium (for example, a ROM, flexible disk, optical disk, and so on) stores a program including computer-executable instructions for causing a device such as a camera, etc., to execute steps of the image display control method according to any one of the embodiments. And then, the program is installed to the device from the recording medium, and then the device executes the program to perform the steps of the image display control method according to any one of the embodiments.

What is claimed is:

1. An imaging apparatus comprising:
two imaging devices, each comprising an imaging optical system including a zoom lens and an imaging element in which a subject image is formed by the imaging optical system;
a lens moving device that moves the zoom lenses along an optical axis direction to differentiate zoom positions of the plurality of imaging devices;
a first imaging control device that consecutively acquires image signals indicating a subject from respective imaging elements of the two imaging devices to take two consecutive plane images when the zoom lenses are moved by the lens moving device;
a display device that can display plane images;
a first display control device that consecutively displays at least one of the two consecutive plane images taken by the first imaging control device on the display device and that displays the two plane images on the display device by at least one of: a first display method for displaying desired one of the two plane images on an entire screen of the display device and displaying the other of the two plane images on the display device in a reduced size; a second display method for displaying the two plane images side by side on the display device; and a third display method for displaying desired one of the two plane images on the entire screen of the display device;
a shooting instruction input device that inputs a shooting instruction;
a second imaging control device that takes two plane images through the two imaging devices in accordance with the inputted shooting instruction; and
a first storage device that stores the two plane images taken by the second imaging control device in a manner associated with information indicating a display method used by the first display control device to display the two plane images just before the shooting instruction is inputted.

2. An imaging apparatus comprising:
two imaging devices, each comprising an imaging optical system including a zoom lens and an imaging element in which a subject image is formed by the imaging optical system;
a lens moving device that moves the zoom lenses in an optical axis direction to differentiate zoom positions of the plurality of imaging devices;
a third imaging control device that consecutively acquires image signals indicating a subject from respective imaging elements of the two imaging devices to take two consecutive plane images after the zoom lenses are moved by the lens moving device;
a display device that can display plane images;
a second display control device that consecutively displays at least one of the two consecutive plane images taken by the third imaging control device on the display device and that displays the two plane images on the display device by at least one of: a first display method for displaying desired one of the two plane images on an entire screen of the display device and displaying the other of the two plane images on the display device in a reduced size; a second display method for displaying the two plane images side by side on the display device; and a third display method for displaying desired one of the two plane images on the entire screen of the display device; and
a second storage device that stores the two plane images consecutively taken by the third imaging control device in a manner associated with information indicating the display method used by the second display control device to display the two plane images.

3. The imaging apparatus according to claim 2, wherein the second storage control device stores two plane images taken within a predetermined duration and information indicating the display method used by the second display control device to display the two plane images when a predetermined time has passed in a manner associated with each other, every time the predetermined time passes.

4. The imaging apparatus according to claim 1, further comprising
a first designation device that designates desired one of the first display method, the second display method, and the third display method, wherein
the display control device displays the two plane images on the display device by the designated display method.

5. The imaging apparatus according to claim 2, further comprising
a first designation device that designates desired one of the first display method, the second display method, and the third display method, wherein
the display control device displays the two plane images on the display device by the designated display method.

6. The imaging apparatus according to claim 1, wherein the first storage device stores the two plane images in one file.

7. The imaging apparatus according to claim 2, wherein the second storage device stores the two plane images in one file.

8. The imaging apparatus according to claim 6, wherein the first storage device stores the information indicating the display method in ancillary information of the one file.

9. The imaging apparatus according to claim 7, wherein the second storage device stores the information indicating the display method in ancillary information of the one file.

10. A display apparatus comprising:
an acquisition device that acquires the two plane images stored by the imaging apparatus according to claim 1 and the information indicating the display method associated with the two plane images;
a display device that displays the acquired two plane images; and a display control device that displays the two plane images on the display device by the display method associated with the two plane images based on the information indicating the display method.

11. A display apparatus comprising:
an acquisition device that acquires the two plane images stored by the imaging apparatus according to claim 2 and the information indicating the display method associated with the two plane images;
a display device that displays the acquired two plane images; and
a display control device that displays the two plane images on the display device by the display method associated with the two plane images based on the information indicating the display method.

12. The display apparatus according to claim 10, further comprising
a designation device that designates desired one of the first display method, the second display method, and the third display method, wherein
the display control device displays the two plane images by the display method designated by the designation device.

13. The display apparatus according to claim 11, further comprising
a designation device that designates desired one of the first display method, the second display method, and the third display method, wherein
the display control device displays the two plane images by the display method designated by the designation device.

14. The display apparatus according to claim 12, further comprising
a storage device that stores the acquired two plane images and the information indicating the display method associated with the two plane images and that stores the information indicating the display method designated by the designation device, in place of the information indicating the display method associated with the two plane images, in association with the two plane images if the display method is designated by the designation device.

15. The display apparatus according to claim 13, further comprising
a storage device that stores the acquired two plane images and the information indicating the display method associated with the two plane images and that stores the information indicating the display method designated by the designation device, in place of the information indicating the display method associated with the two plane images, in association with the two plane images if the display method is designated by the designation device.

16. The display apparatus according to claim 14, wherein
the acquisition device acquires consecutively taken images as the two plane images, and
the storage device stores two plane images displayed on the display device within a predetermined duration in a manner associated with information indicating the display method used by the display control device to display the two plane images when a predetermined time has passed, every time the predetermined time passes.

17. The display apparatus according to claim 15, wherein
the acquisition device acquires consecutively taken images as the two plane images, and
the storage device stores two plane images displayed on the display device within a predetermined duration in a manner associated with information indicating the display method used by the display control device to display the two plane images when a predetermined time has passed, every time the predetermined time passes.

* * * * *